United States Patent
Fino

(10) Patent No.: US 9,244,584 B2
(45) Date of Patent: Jan. 26, 2016

(54) DEVICE, METHOD, AND GRAPHICAL USER INTERFACE FOR NAVIGATING AND PREVIEWING CONTENT ITEMS

(75) Inventor: Jorge Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/333,900

(22) Filed: Dec. 21, 2011

(65) Prior Publication Data
US 2013/0055083 A1   Feb. 28, 2013

Related U.S. Application Data

(60) Provisional application No. 61/528,098, filed on Aug. 26, 2011.

(51) Int. Cl.
    *G06F 3/0481*    (2013.01)
    *G06F 3/0485*    (2013.01)
    *G06F 3/0488*    (2013.01)

(52) U.S. Cl.
CPC ............ *G06F 3/0481* (2013.01); *G06F 3/0485* (2013.01); *G06F 3/04883* (2013.01); *G06F 3/04886* (2013.01); *G06F 2203/04808* (2013.01)

(58) Field of Classification Search
CPC .............. H04N 5/44543; G06F 3/0481; G06F 3/04855; G06F 3/0485
USPC .......... 715/716, 786, 727, 788, 815, 830, 838
See application file for complete search history.

(56) References Cited

U.S. PATENT DOCUMENTS

| | | | |
|---|---|---|---|
| 5,305,435 A | 4/1994 | Bronson | |
| 6,262,724 B1 | 7/2001 | Crow et al. | |
| 8,875,046 B2 | 10/2014 | Jitkoff | |
| 2002/0054158 A1 | 5/2002 | Asami | |
| 2006/0038796 A1 | 2/2006 | Hinckley et al. | |
| 2006/0271867 A1* | 11/2006 | Wang et al. | 715/764 |
| 2006/0279541 A1 | 12/2006 | Kim et al. | |

(Continued)

FOREIGN PATENT DOCUMENTS

| | | |
|---|---|---|
| CN | 101359291 A | 2/2009 |
| CN | 100530059 C | 8/2009 |

OTHER PUBLICATIONS

Miser, B., "Sams Teach Yourself iTunes® 10 in 10 Minutes", (Dec. 30, 2010), Sams, p. 65 and 67-69.*
Bove, T., iPod & iTunes for Dummies, Wiley Publishing, Inc., 6th Edition , 2008, pp. 143-182.
Office Action dated May 1, 2013, received in U.S. Appl. No. 13/333,890, 26 pages (Fino).

(Continued)

*Primary Examiner* — William Bashore
*Assistant Examiner* — Mong-Shune Chung
(74) *Attorney, Agent, or Firm* — Morrison & Foerster LLP

(57) ABSTRACT

A portable electronic device displays concurrently a first predefined scrollable area and a second predefined scrollable area distinct from the first predefined scrollable area. The first predefined scrollable area includes a plurality of graphical objects and is configured to scroll in a first direction. Each of the plurality of graphical objects represents a respective set of content items. The second predefined scrollable area includes a list of content items and is configured to scroll in a second direction that is orthogonal to the first direction. The device detects a gesture that corresponds to selection of a first graphical object of the plurality of graphical objects in the first predefined scrollable area; and, in response to detecting the gesture, plays respective portions of one or more content items in the set of content items that correspond to the selected first graphical object.

16 Claims, 27 Drawing Sheets

(56) References Cited

U.S. PATENT DOCUMENTS

| | | |
|---|---|---|
| 2007/0220443 A1 | 9/2007 | Cranfill et al. |
| 2007/0226645 A1 | 9/2007 | Kongqiao et al. |
| 2008/0165141 A1 | 7/2008 | Christie |
| 2008/0168384 A1 | 7/2008 | Platzer et al. |
| 2009/0307633 A1 | 12/2009 | Haughay, Jr. et al. |
| 2010/0088634 A1 | 4/2010 | Tsuruta et al. |
| 2010/0088639 A1* | 4/2010 | Yach et al. .................... 715/825 |
| 2010/0122195 A1 | 5/2010 | Hwang |
| 2010/0229094 A1* | 9/2010 | Nakajima et al. ............. 715/727 |
| 2010/0231537 A1 | 9/2010 | Pisula et al. |
| 2010/0257484 A1 | 10/2010 | Nakamura et al. |
| 2010/0283743 A1 | 11/2010 | Coddington |
| 2010/0306657 A1 | 12/2010 | Derbyshire et al. |
| 2011/0209099 A1* | 8/2011 | Hinckley et al. ............. 715/863 |
| 2012/0084697 A1 | 4/2012 | Reeves |
| 2012/0131459 A1* | 5/2012 | Ilama-Vaquero et al. .... 715/716 |
| 2013/0191220 A1 | 7/2013 | Dent et al. |

OTHER PUBLICATIONS

Office Action dated Aug. 30, 2013, received in U.S. Appl. No. 13/333,890, 25 pages (Fino).
Extended European Search Report (includes Partial European Search Report and European Search Opinion) received for European Patent Application No. 12181537.7, mailed on Mar. 27, 2014, 7 pages.
Final Office Action received for U.S. Appl. No. 13/333,890, mailed on Feb. 13, 2014, 19 pages.
Office Action received for Chinese Patent Application No. 201210308569.5, mailed on Nov. 19, 2014, 24 pages (8 pages of English Translation and 16 pages of Official Copy).
Non-Final Office Action received for U.S. Appl. No. 13/333,890, mailed on Jun. 5, 2015, 20 pages.
Intention to Grant Received for European Patent Application No. 12181537.7, mailed on Sep. 22, 2015, 7 pages.
Office Action received for Chinese Patent Application No. 201210308569.5, mailed on Sep. 1, 2015, 39 pages (22 pages of English Translation and 17 pages of Official Copy).

* cited by examiner

DEVICE, METHOD, AND GRAPHICAL USER INTERFACE FOR NAVIGATING AND PREVIEWING CONTENT ITEMS

RELATED APPLICATIONS

This application claims priority to U.S. Provisional Application Ser. No. 61/528,098, filed Aug. 26, 2011, which incorporated by reference herein its entirety.

This application is related to U.S. application Ser. No. 13/333,890, filed Dec. 21, 2011, entitled "Device, Method, and Graphical User Interface for Navigating and Previewing Content Items," which is incorporated by reference herein in its entirety.

TECHNICAL FIELD

This relates generally to electronic devices with touch-sensitive surfaces, including but not limited to electronic devices with touch-sensitive surfaces that navigate and preview content items.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display, such as objects that correspond to digital content (e.g., music and videos).

Exemplary manipulations include navigating, viewing, selecting, and playing content items in a video and music player (e.g., iPod from Apple Inc. of Cupertino, Calif.). But existing methods for navigating through and previewing content items are cumbersome and inefficient. Previewing can become tedious and create a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for navigating and previewing content items. Such methods and interfaces may complement or replace conventional methods for navigating and previewing content items. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at a portable electronic device with a display and a touch-sensitive surface. The method includes displaying concurrently on the display a first predefined scrollable area and a second predefined scrollable area distinct from the first predefined scrollable area. The first predefined scrollable area includes a plurality of graphical objects. Each of the plurality of graphical objects represents a respective set of content items. The first predefined scrollable area is configured to scroll in a first direction. The second predefined scrollable area includes a list of content items. The second predefined scrollable area is configured to scroll in a second direction that is orthogonal to the first direction. The method also includes detecting a gesture that corresponds to selection of a first graphical object of the plurality of graphical objects in the first predefined scrollable area; and, in response to detecting the gesture that corresponds to selection of the first graphical object, playing respective portions of one or more content items in the set of content items that correspond to the selected first graphical object.

In accordance with some embodiments, a method is performed at a portable electronic device with a display and a touch-sensitive surface. The method includes displaying concurrently on the display a pointer object and a predefined scrollable area. The predefined scrollable area includes a plurality of graphical objects. Each of the plurality of graphical objects represents a respective set of content items. The predefined scrollable area is configured to scroll in a first direction. The method also includes detecting a finger drag gesture or a finger swipe gesture; and, in response to detecting the finger drag gesture or the finger swipe gesture: scrolling the plurality of graphical objects such that the pointer object coincides with at least a portion of a first graphical object in the plurality of graphical objects; and playing respective portions of one or more content items in the set of content items that correspond to the first graphical object.

In accordance with some embodiments, a portable electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a portable electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a portable electronic device with a display and a touch-sensitive surface, cause the device to perform the operations of any of the methods described above. In accordance with some embodiments, a portable electronic device includes: a display, a touch-sensitive surface; and means for performing the operations of any of the methods described above. In accordance with some embodiments, an information processing apparatus, for use in a portable electronic device with a display and a touch-sensitive surface, includes means for performing the operations of any of the methods described above.

In accordance with some embodiments, an electronic device includes a display unit configured to display concurrently on the display unit a first predefined scrollable area and a second predefined scrollable area distinct from the first predefined scrollable area. The first predefined scrollable area includes a plurality of graphical objects. Each of the plurality of graphical objects represents a respective set of content items. The first predefined scrollable area is configured to scroll in a first direction. The second predefined scrollable area includes a list of content items. The second predefined scrollable area is configured to scroll in a second direction that is orthogonal to the first direction. The electronic device also includes a touch-sensitive surface unit configured to receive gestures, and a processing unit coupled to the display unit and the touch-sensitive surface unit. The processing unit is configured to: detect a gesture that corresponds to selection of a first graphical object of the plurality of graphical objects in the first predefined scrollable area; and, in response to detecting the gesture that corresponds to selection of the first graphical object, play respective portions of one or more content items in the set of content items that correspond to the selected first graphical object.

In accordance with some embodiments, an electronic device includes a display unit configured to display concurrently on the display unit a pointer object and a predefined scrollable area. The predefined scrollable area includes a plurality of graphical objects. Each of the plurality of graphical objects represents a respective set of content items. The predefined scrollable area is configured to scroll in a first direction. The electronic device also includes a touch-sensitive surface unit configured to receive gestures, and a processing unit coupled to the display unit and the touch-sensitive surface unit. The processing unit is configured to: detect a finger drag gesture or a finger swipe gesture; and, in response to detecting the finger drag gesture or the finger swipe gesture: scroll the plurality of graphical objects such that the pointer object coincides with at least a portion of a first graphical object in the plurality of graphical objects, and play respective portions of one or more content items in the set of content items that correspond to the first graphical object.

Thus, portable electronic devices with displays and touch-sensitive surfaces are provided with faster, more efficient methods and interfaces for navigating and previewing content items, thereby increasing the effectiveness, efficiency, and user satisfaction with such devices. Such methods and interfaces may complement or replace conventional methods for navigating and previewing content items.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
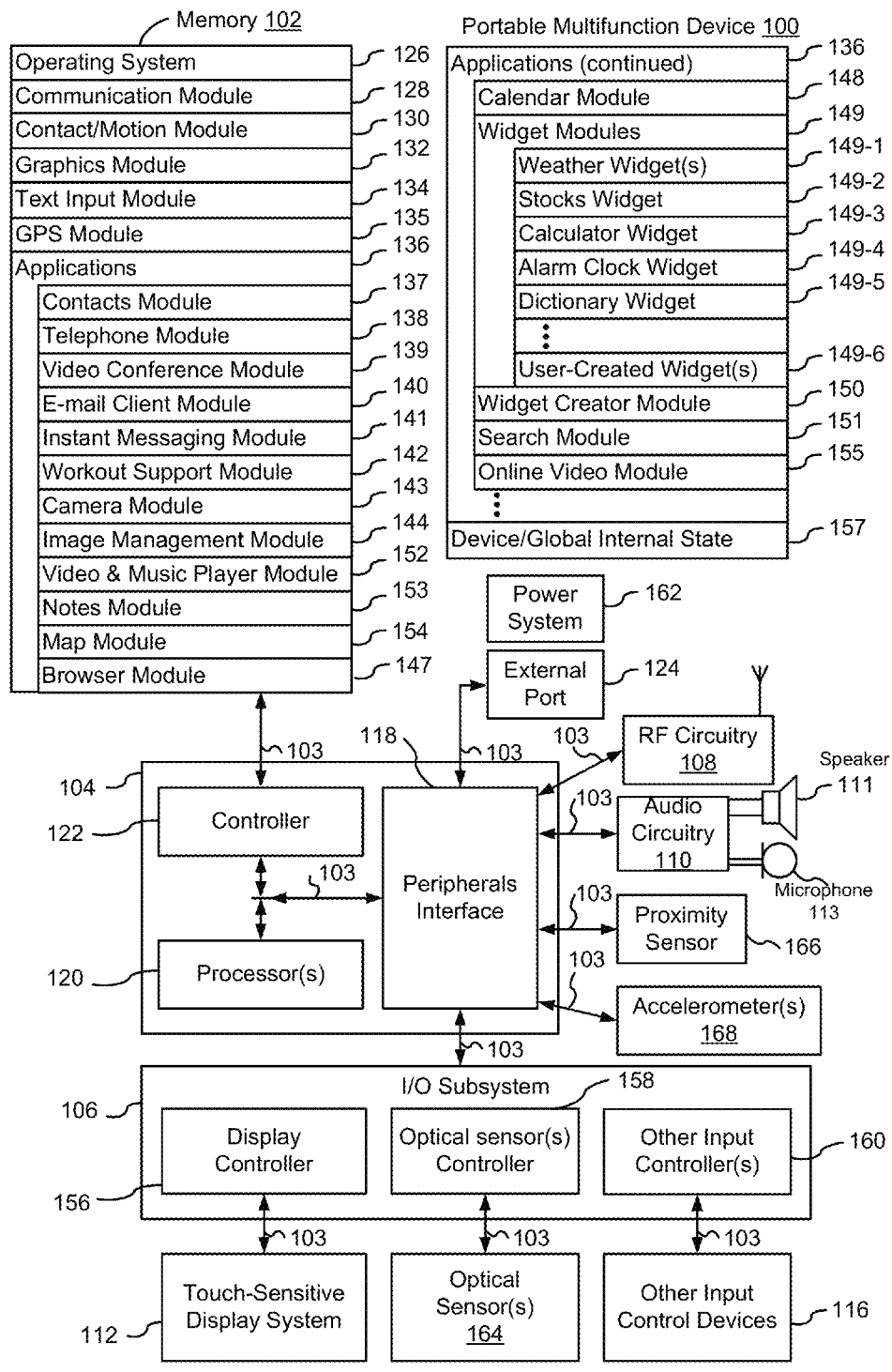
FIG. 1A is a block diagram illustrating a portable multifunction device with a touch-sensitive display in accordance with some embodiments.

A user's media library may include many sets of content items, such as albums of songs. A user may wish to select a subset of that content for playback for a certain situation. Users often want to preview the different sets of content items, in order to make an informed selection. The embodiments described below provide an efficient way to navigate and preview content items. Graphical objects corresponding to sets of content items (e.g., album cover art corresponding to albums) are laid out in a scrollable area with a pointer object. Content items in the set corresponding to a graphical object that is aligned with the pointer object are previewed. The user may scroll the scrollable area to align different graphical objects with the pointer object, and thus quickly preview different sets of content items.

Below, FIGS. 1A-1B, 2, 3A-3B, and 8 provide a description of exemplary devices. FIGS. 4A-4B and 5A-5K illustrate exemplary user interfaces for navigating and previewing content items. FIGS. 6A-6D and 7A-7D are flow diagrams illustrating methods of navigating and previewing content items. The user interfaces in FIGS. 5A-5K are used to illustrate the processes in FIGS. 6A-6D and 7A-7D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
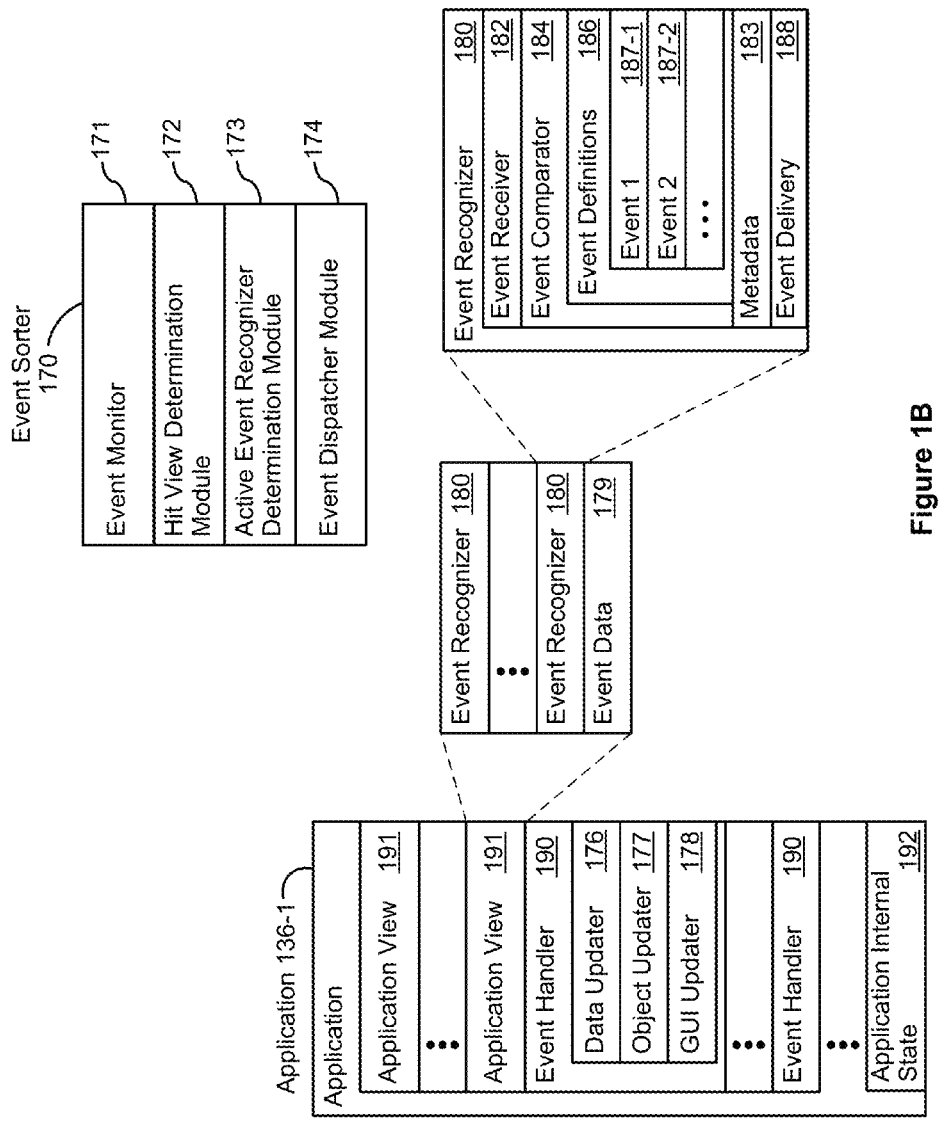
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
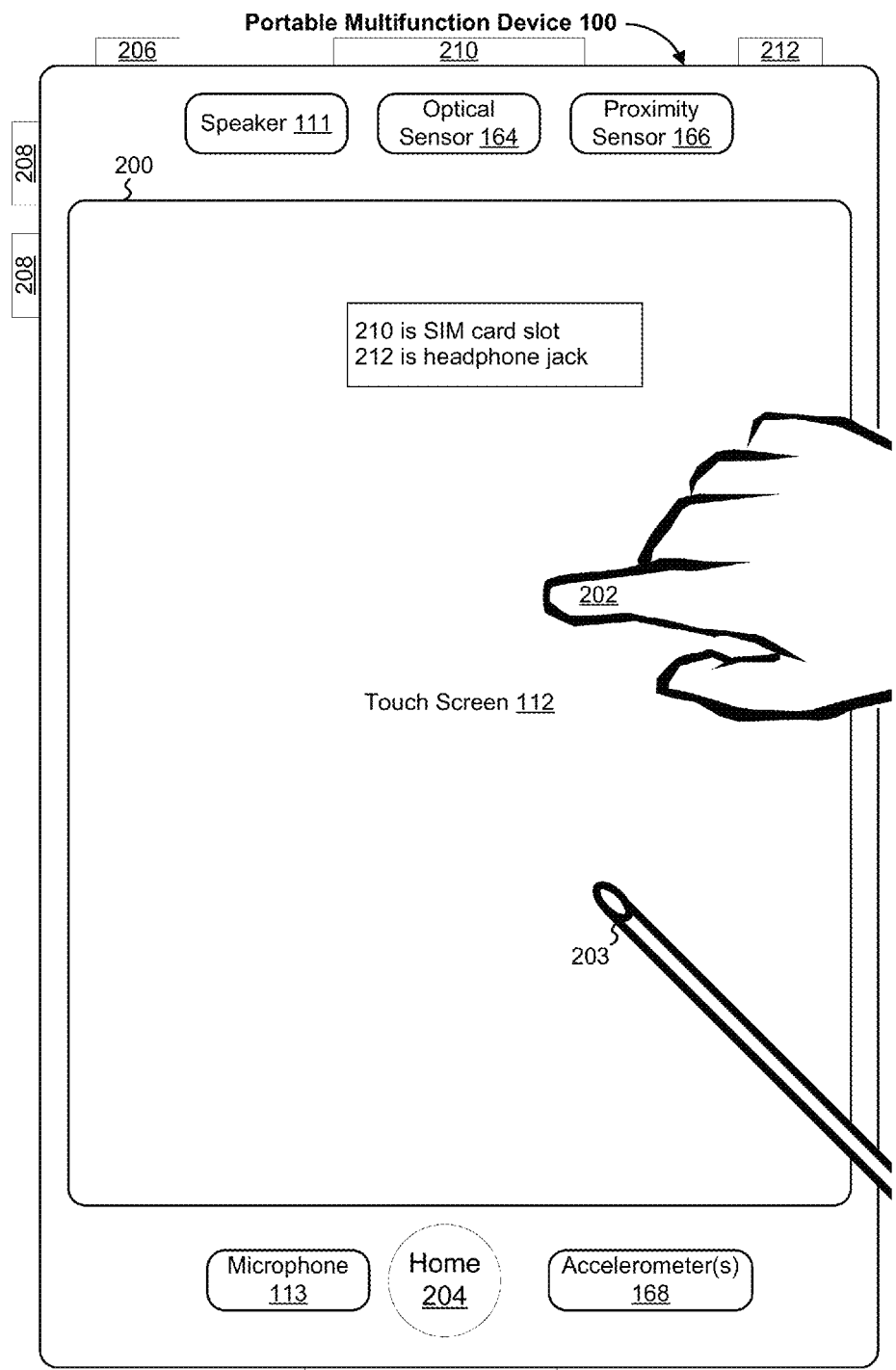
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Figure 3A:
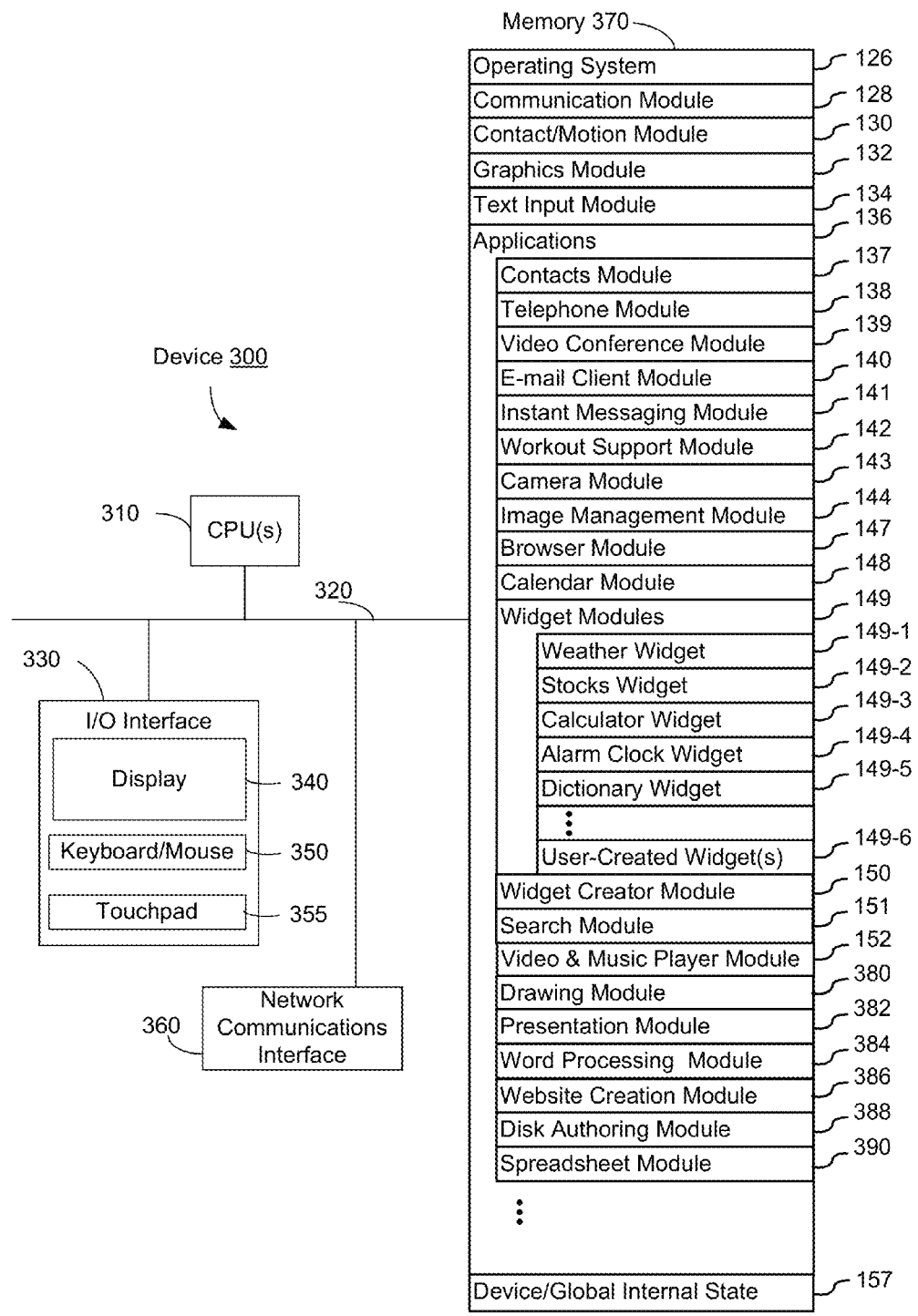
FIG. 3A is a block diagram of an exemplary multifunction device with a display and a touch-sensitive surface in accordance with some embodiments.
Figure 3B:
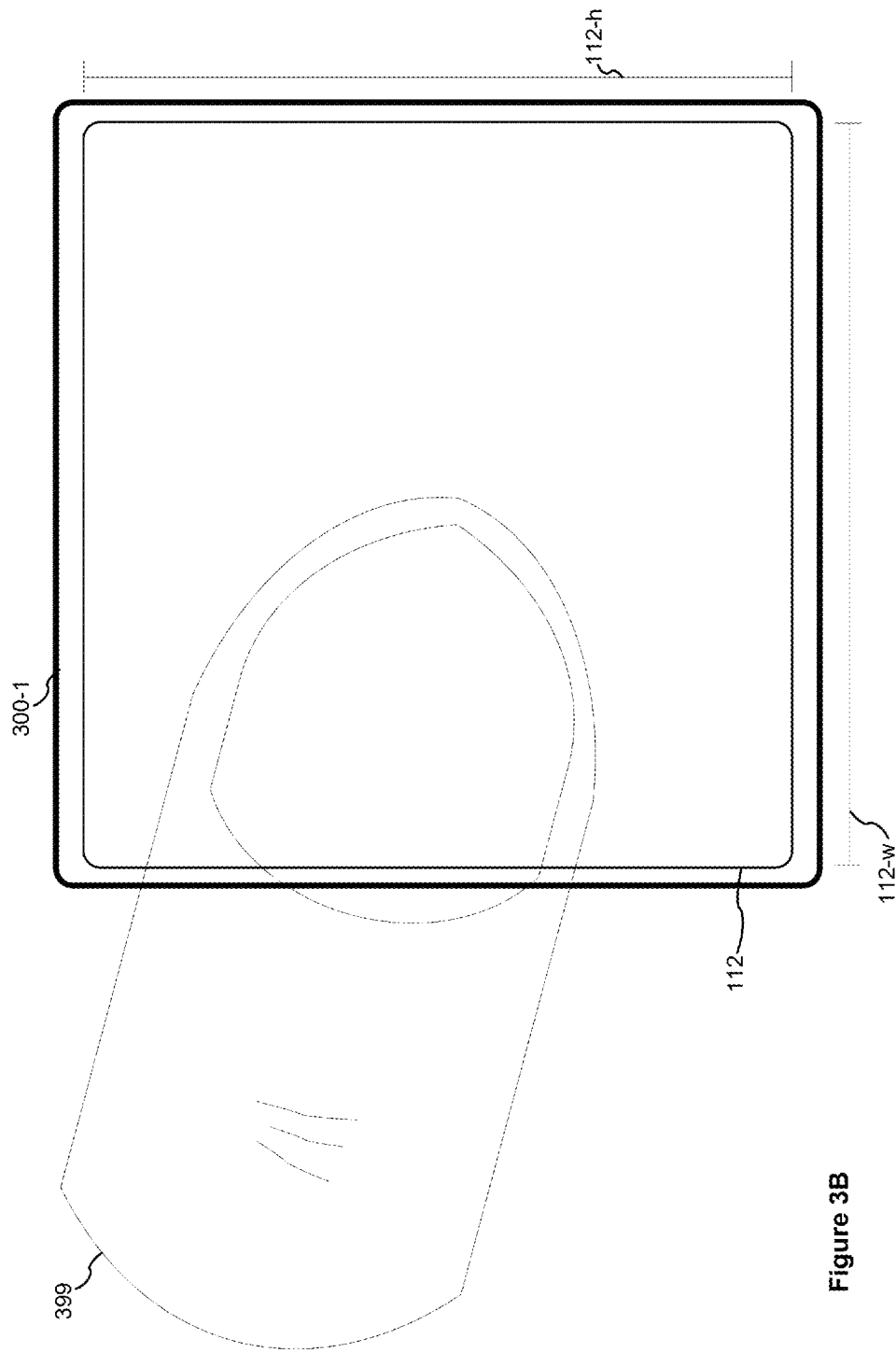
FIG. 3B illustrates an exemplary portable electronic device with a touch-screen in accordance with some embodiments.

Though electronic device 300 is depicted as a multifunction device including I/O interface 330 that incorporates keyboard/mouse 350 and touchpad 355, in some embodiments, electronic device 300-1, as illustrated in FIG. 3B, is a portable electronic device that uses touch-screen 112 without a keyboard, mouse, or independent touchpad. In some embodiments, device 300 is a portable electronic device with touch-screen 112, and is used principally as a portable media player.

For example, portable electronic device 300-1 includes touch-screen 112 with width 112-w and height 112-h, which in this example are both 2 inches. User's thumb 399, shown superimposed on touch-screen 112, is approximately half the width 112-w or height 112-h of touch-screen 112.

Thus, in some portable media player embodiments, touch-screen 112 may have physical dimensions of 2 inches or less in width and/or height. In some portable media player embodiments, touch-screen 112 may have a screen resolution of 600 pixels or less in width and/or height. In some portable media player embodiments, touch-screen 112 may have a screen resolution of 900 pixels or less in width and/or height. In some portable media player embodiments, touch-screen 112 may have a screen resolution of 1200 pixels or less in width and/or height.

In some embodiments, memory 370 may store a subset of the modules and data structures identified above. In some portable media player embodiments, electronic device 300-1 may be a smaller physical device, and typically would not include certain of the module, data structures, and applications identified above that would be used in full-featured portable multifunction devices, e.g., as a portable electronic device 300-1 with touch-screen 112, one or more of the following may not be included: telephone module 138, chart module 144, drawing module 380, presentation module 382, word processing module 384, website creation module 386, and disk authoring module 388.

Attention is now directed towards embodiments of user interfaces ("UI") that may be implemented on portable multifunction device 100.

Figure 4A:
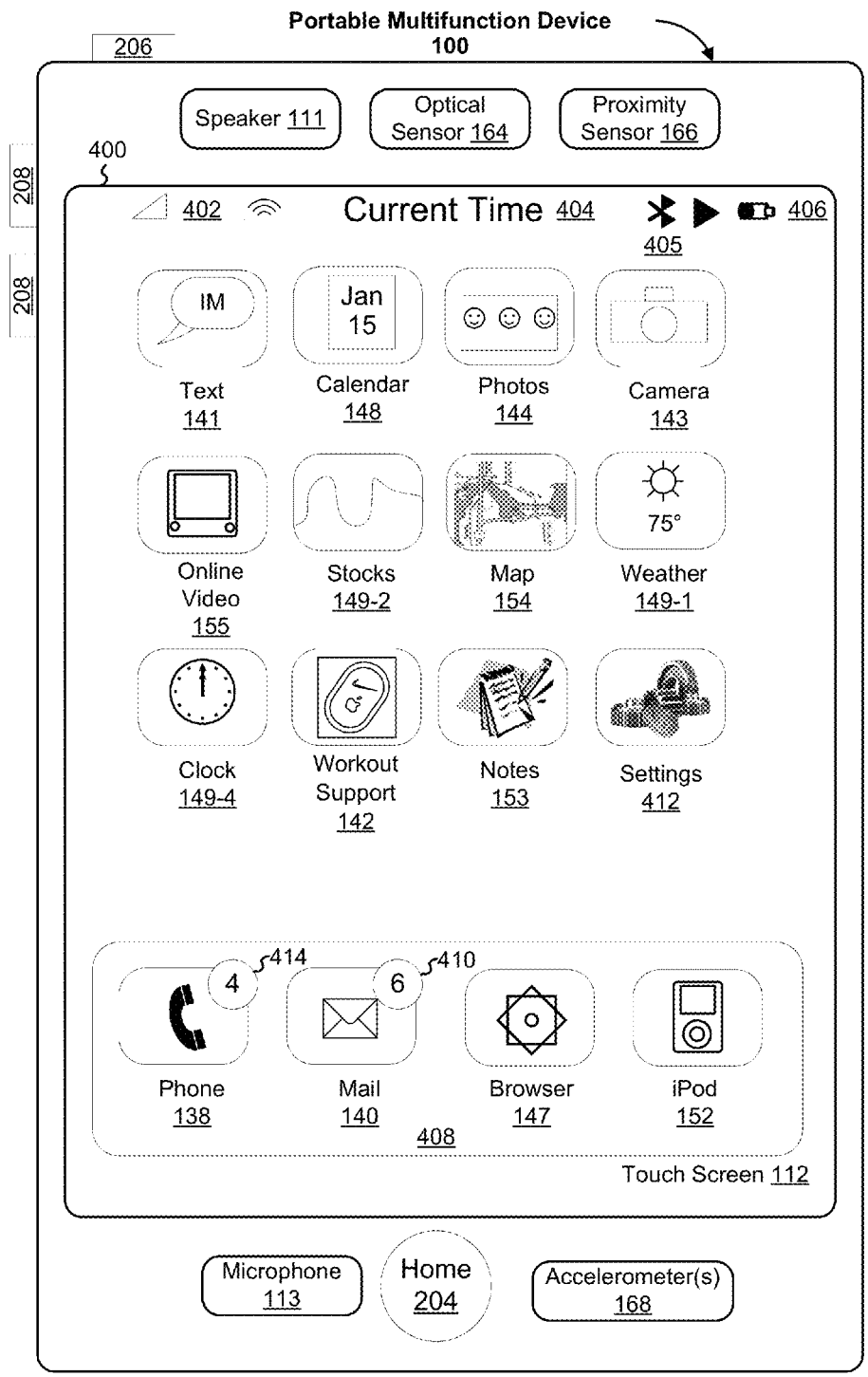
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Video and music player 152, also referred to as iPod (trademark of Apple Inc.) module 152; and
Icons for other applications, such as:
IM 141;
Image management 144;
Camera 143;
Weather 149-1;
Stocks 149-2;
Workout support 142;
Calendar 148;
Alarm clock 149-4;
Map 154;
Notes 153;
Settings 412, which provides access to settings for device 100 and its various applications 136; and
Online video module 155, also referred to as YouTube (trademark of Google Inc.) module 155.

Figure 4B:
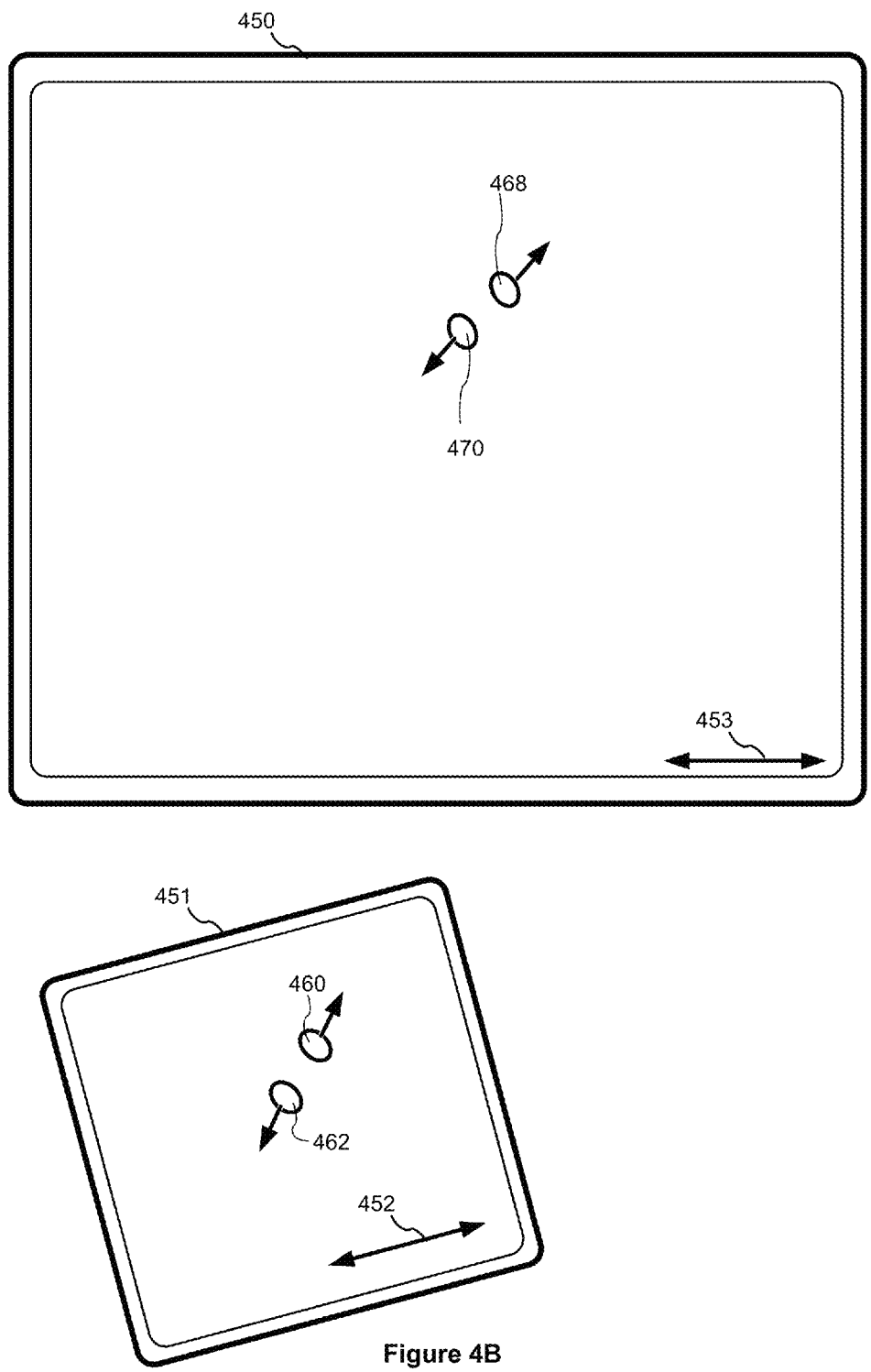
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input, click wheel input, or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300-1 or portable multifunction device 100.

FIGS. 5A-5K illustrate exemplary user interfaces for navigating and previewing content items in accordance with some embodiments. The user interfaces in these figures are used to illustrate the processes described below, including the processes in FIGS. 6A-6D and 7A-7D.

Figure 5A:
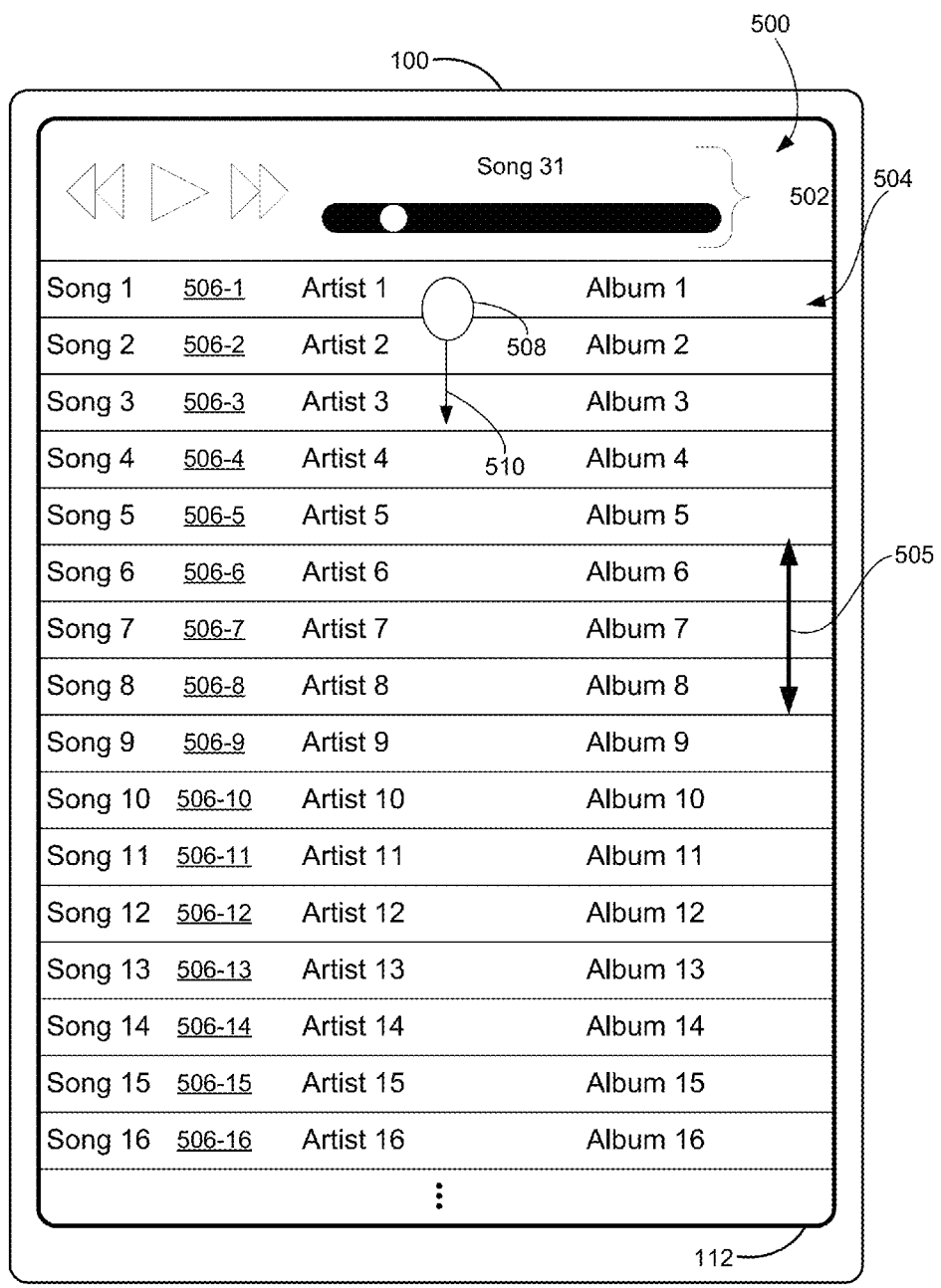
FIGS. 5A-5K illustrate exemplary user interfaces for navigating and previewing content items in accordance with some embodiments.

FIG. 5A illustrates content application interface 500 displayed on touch screen 112 of device 100. Content application interface 500 may be a part of a content (e.g., digital media) management and/or playback application, such as video and music player module 152. Content application interface 500 includes playback controls 502 and content items list 504.

Playback controls 502 include virtual buttons and other user interface elements for controlling playback of content items. For example, playback controls may include a play/pause button, forward and backward buttons, and a progress bar with progress indicator. Playback controls 502 may also display information (e.g., title, artist, album, etc.) of the content item being played.

Content items list 504 lists one or more content items 506 and display information about content items 506. The information that may be displayed about content items 506 include, for example, title, artist, album, composer, genre, and so on. Content items list 504 is scrollable along axis 505 to reveal content items 506 that are out of view. Content items list 504 may be scrolled along axis 505 in accordance with a gesture (e.g., drag or swipe gesture) moving parallel to axis 505 that is detected on content items list 504. For example, a gesture similar to gesture 508 moving in direction 510 scrolls content items list 504 toward the top (i.e., moves list 504 downward so that items nearer to the top of list 504 are displayed).

Figure 5B:
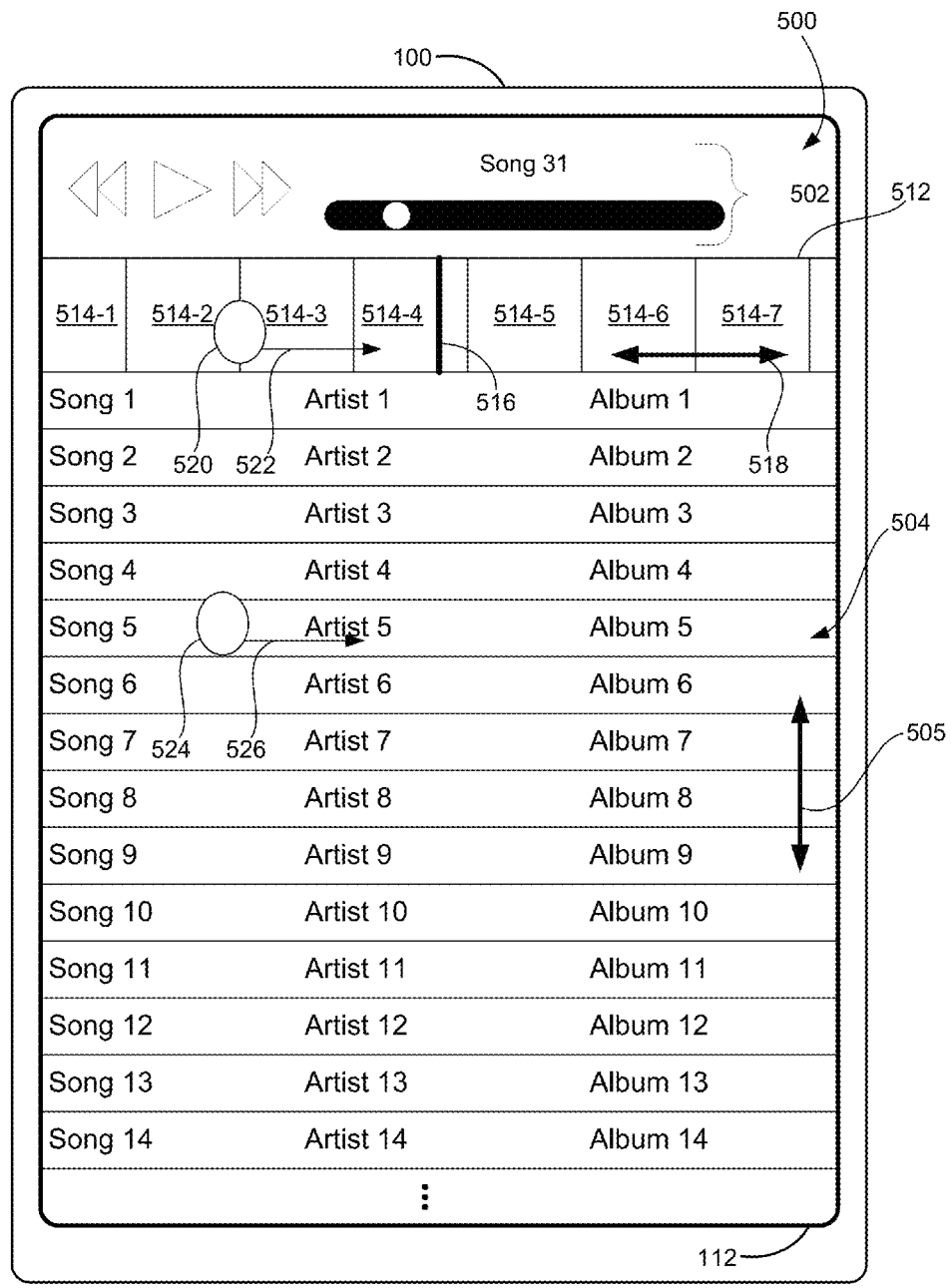

When list 504 has been scrolled to its top, gesture 508, moving in direction 510, is detected on touch screen 112 in content items list 504. In some embodiments, gesture 508 is a finger drag or finger swipe gesture. In response to the detection of gesture 508 when list 504 has been scrolled to its top, content preview area 512 is displayed (FIG. 5B). In some embodiments, content preview area 512 is adjacent to content items list 504.

Figure 5C:
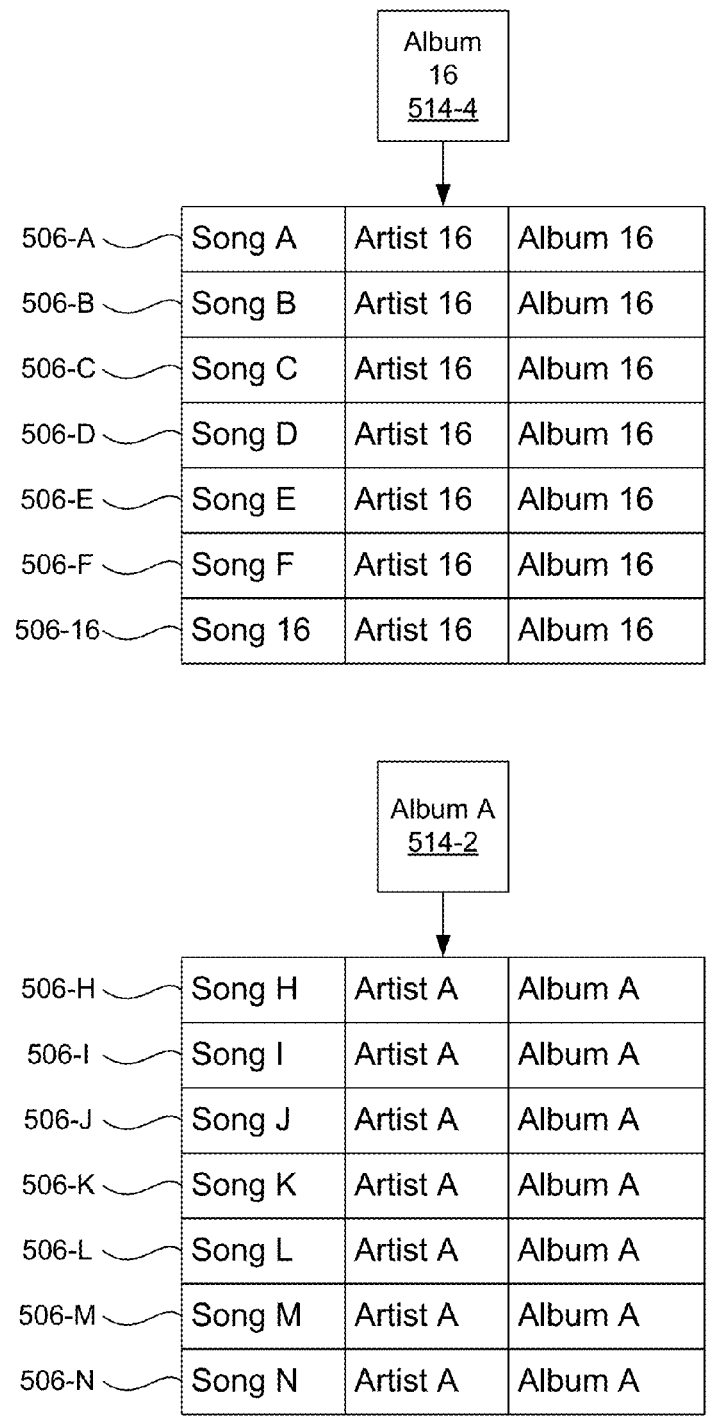
Figure 5D:
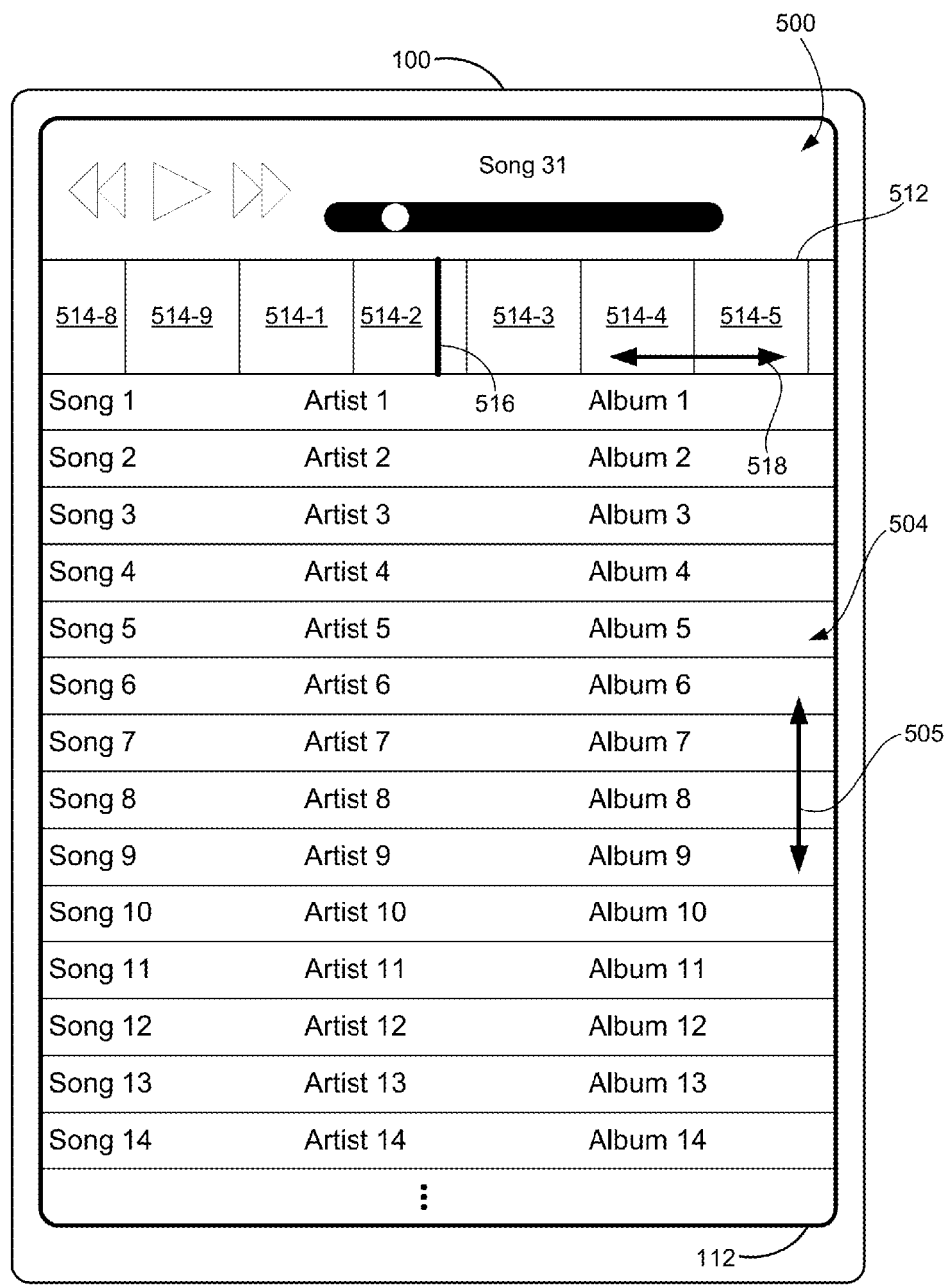

Content preview area 512 includes one or more graphical objects 514. Each graphical object 514 represents a respective set of content items. The sets of content items may be content items organized by album, artist, genre, or playlist membership. For example, as illustrated in FIG. 5C, graphical object 514-4 represents a set of content items that include content items 506-A thru 506-F and 506-16. Graphical object 514-2 represents another set of content items that include content items 506-H thru 506-N. The content items in the sets represented by graphical objects 514 are included in content items list 504.

Graphical objects 514 identify the albums, artists, genres, or playlists to which the sets of content items belong. For example, if graphical objects 514 represent albums, graphical objects 514 may be album cover or album art images, or another album identifier (e.g., album name). For example, if graphical objects 514-4 and 514-2 are album cover images, as illustrated in FIG. 5C, then the set of content items that include items 506-A thru 506-F and 506-16 is an album corresponding to graphical object 514-4 (hereinafter "Album 16"), and the set of content items that include items 506-H thru 506-N is an album corresponding to graphical object 514-2 (hereinafter "Album A"). If graphical objects 514 represent artists, graphical objects 514 may be artist photos and, if an artist photo is not available, the artist name. If graphical objects 514 represent genres, graphical objects 514 may be names and/or icons corresponding to respective genres. If graphical objects 514 represent playlists, graphical objects 514 may be playlist names.

Graphical objects 514 may be displayed in a single row in content preview area 512, as shown in FIG. 5B. Content preview area 512 may be scrollable. Thus, for example, if there are more graphical objects 514 than can be displayed at once, content preview area 512 may be scrolled to reveal graphical objects 514 that were not displayed. In some embodiments, scrolling axis 518 of content preview area 512 is orthogonal to scrolling axis 505 of content items list 504 (FIG. 5B).

Pointer object 516 is displayed in content preview area 512 concurrently with graphical objects 514. Pointer object 516 may be displayed at a fixed position (e.g., at the center of content preview area 512).

Content preview area 512 may be scrolled by a gesture. In some embodiments, the gesture is a gesture in content preview area 512 moving parallel to axis 518 (e.g., gesture 520 moving in direction 522, FIG. 5B). In some other embodiments, the gesture is a gesture in either content preview area 512 or in content items list 504 moving parallel to axis 518 (e.g., gesture 524 moving in direction 526, FIG. 5B). When content preview area 512 is scrolled, pointer object 516 may be aligned with a respective graphical object 514, or at least a portion of that object. For example, in FIG. 5B, pointer object 516 is aligned with graphical object 514-4. When pointer object 516 is moved into alignment with graphical object 514-4 (e.g., in response to a gesture to scroll content preview area 512), graphical object 514-4 is selected. When graphical object 514-4 is selected, respective portions of content items in Album 16 may be played. For example, a portion of Song A 506-A is played. Then, respective portions of Song B 506-B, Song C 506-C, and so on through Album 16 are played.

In response to gesture 520 or 524, content preview area 512 is scrolled, and different graphical objects 514 may be aligned with pointer object 516 as a result. For example, in FIG. 5D, graphical object 514-2 is scrolled into alignment with pointer object 516 in response to gesture 520. In response to graphical object 514-2 being aligned with pointer object 516, respective portions of content items in Album A (e.g., content items 506-H thru 506-N) are played.

In some embodiments, playing respective portions of content items in a set of content items corresponding to a graphical object 514 involves playing each respective item for a predefined duration (e.g., 30 seconds, 60 seconds, or 90 seconds) from a starting location in the respective item. In some embodiments, the starting location is predefined (e.g., the beginning of the item, the quarter point in the item, or the halfway point in the item).

In some embodiments, when portions of multiple content items in a set of content items are played (e.g., items 506-A, 506-B, etc.), the order in which the items are played corresponds to the order of the items within the set of items (e.g., album track order or a playlist order). In some other embodiments, the order in which the items are played is a shuffled (random) order.

In some embodiments, when respective portions of all the content items in a set of content items are played, the playback stops. In some other embodiments, the playback loops; the portion of the first item is played again, then the portion of the second item, and so on.

As shown in FIG. 5B, graphical object 514-4 is aligned with pointer object 516, and a portion of a content item in Album 16 is playing (due to the alignment), when gesture 520 (or gesture 524) is detected. In response to the detection of gesture 520 (or gesture 524), content preview area 512 is scrolled. In some embodiments, while content preview area 512 is scrolling and pointer object 516 continues to be aligned with graphical object 514-4, the portion of the content item that is playing prior to the scrolling ceases to be played, and portions of other content items in Album 16 are played. While content preview item 512 continues scrolling and another graphical object 514 comes into alignment with pointer object 516, portions of content items in the set of content items corresponding to the newly aligned graphical object 514 are played. For example, in FIGS. 5B and 5D, as content preview area 512 scrolls from aligning graphical object 514-4 with pointer object 516 to aligning graphical object 514-2 with pointer object 516, graphical object 514-3 comes into alignment with pointer object 516 during the scrolling. In response, portions of content items in the set of content items corresponding to graphical object 514-3 are played.

Thus, content preview area 512 operates in some respects like an analog radio tuner dial. Pointer object 516 is analogous to a marker, on the tuner, of the radio channel being received. As content preview area 512 is scrolled, pointer object 516 comes into alignment with different graphical objects 514, and content items in sets of content items corresponding to those graphical objects 514 are previewed.

Figure 5E:
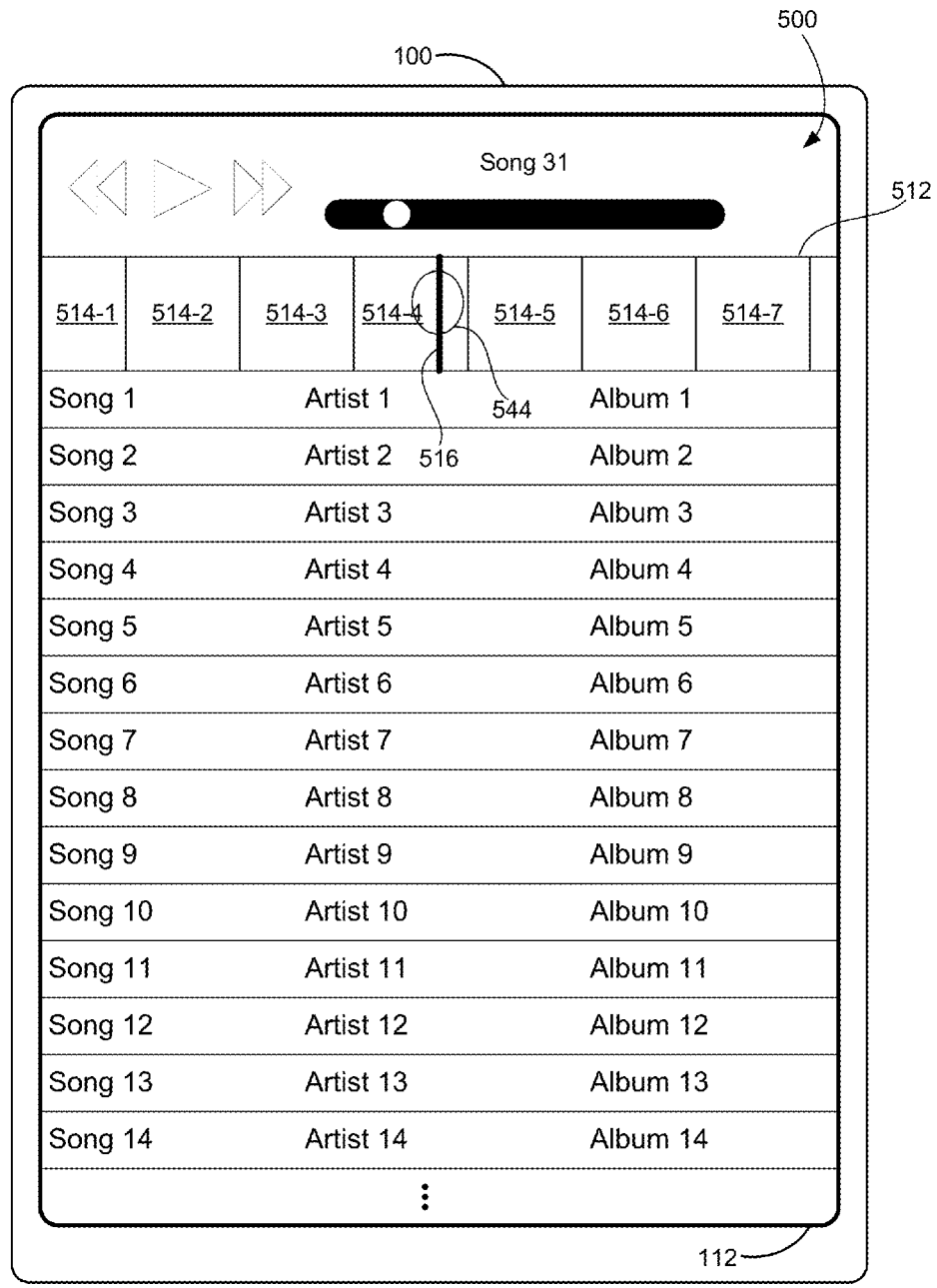

FIG. 5E illustrates graphical object 514-4 aligned with pointer object 516 in content preview area 512; a portion of a content item (e.g., Song A 506-A, FIG. 5C) in Album 16 is playing. Gesture 544 (e.g., a tap gesture) is detected on pointer object 516 (and on graphical object 514-4). In response to the detection of gesture 544, the content item the portion of which was playing prior to gesture 544 is played in its entirety, as shown in FIG. 5F where playback controls 502 shows Song A (i.e., Song A 506-A) as being played in its entirety.

Figure 5F:
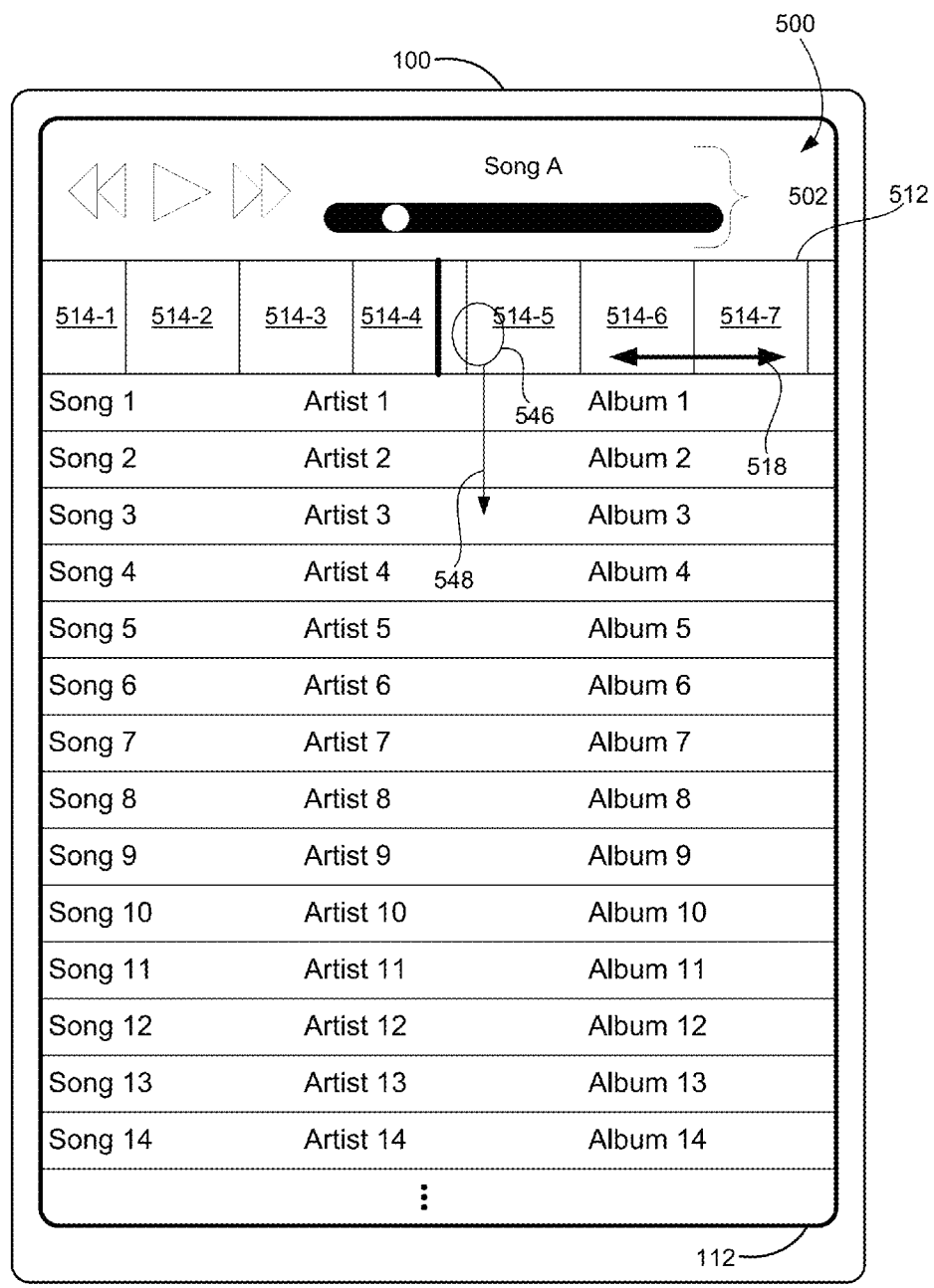
Figure 5G:
Figure 5H:
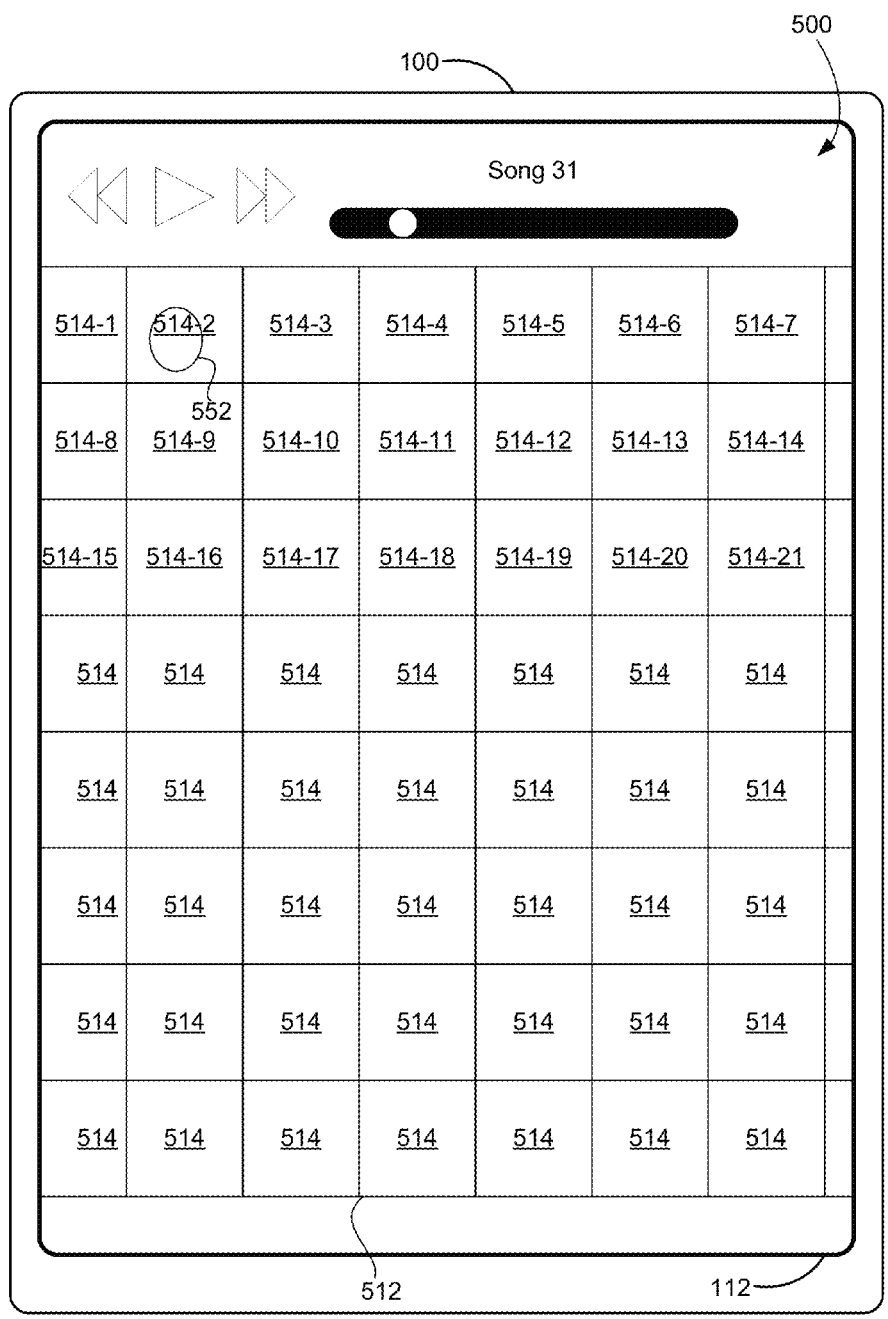

FIG. 5F illustrates gesture 546 starting from content preview area 546 and moving in direction 548 orthogonal to axis 518. In some embodiments, gesture 546 is a finger drag or finger swipe gesture. In response to the detection of gesture 546, content preview area 512 is expanded from a single row of graphical objects 514 to multiple rows of graphical objects 514, as shown in FIGS. 5G-5H. FIG. 5G shows an instant in the transition of content preview area 512 from the single row to the multi-row array shown in FIG. 5H. The multiple rows of graphical objects 514 form an array of graphical objects 514. The array of graphical objects 514 may hide content items list 504 completely, as shown in FIG. 5H.

FIG. 5H illustrates gesture 552 detected on graphical object 514-2 while content preview area 512 is in the multi-row size. In response to the detection of gesture 552, one or more respective portions of content items in Album A (i.e., content items 506-H thru 506-N, FIG. 5C) are played.

Figure 5I:
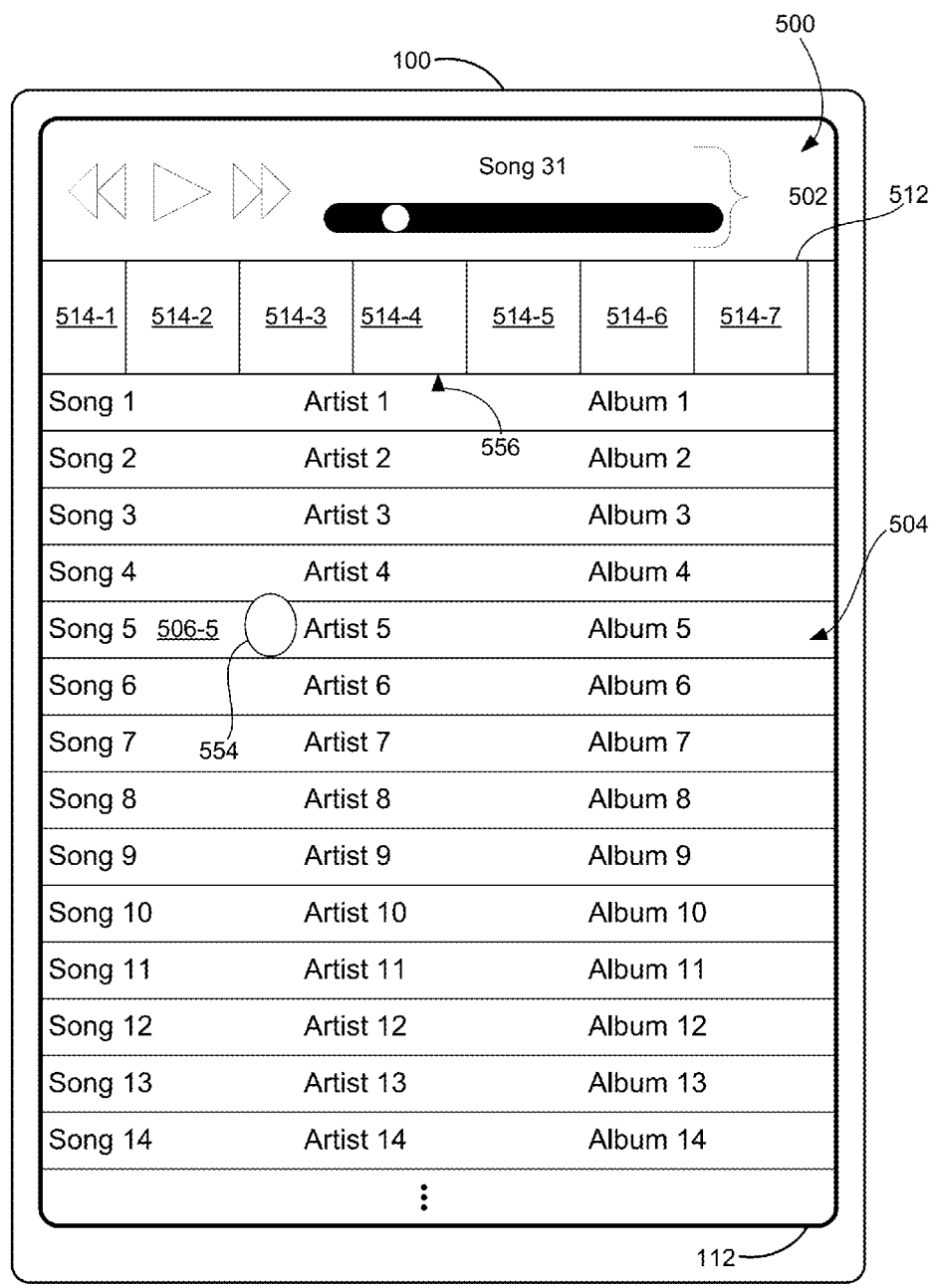
Figure 5J:
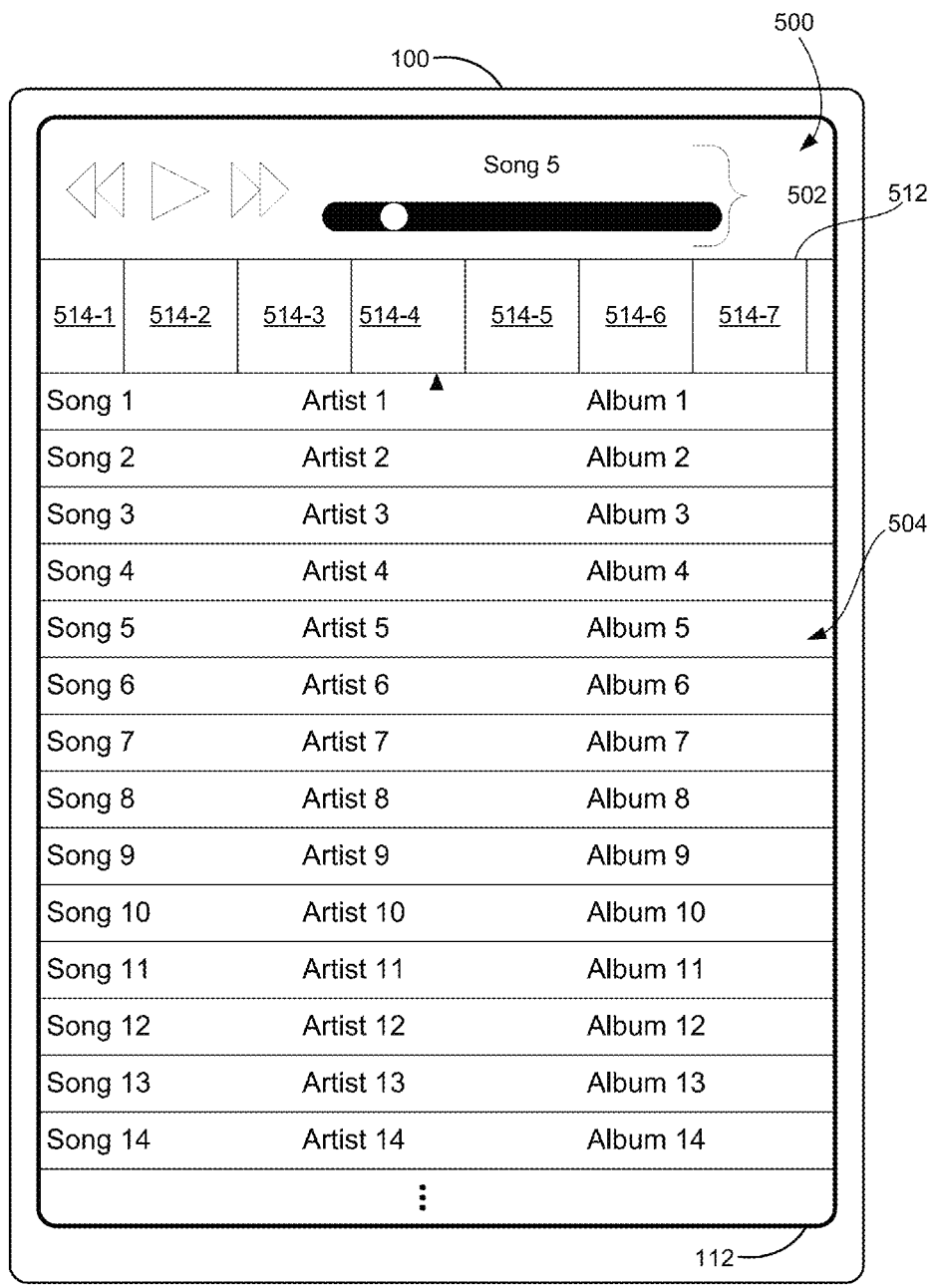

FIG. 5I illustrates content preview area 512 with a pointer object 556 that is outside of and adjacent to content preview area 512, unlike pointer object 516 that is in, or at least overlaps, content preview area 512. FIG. 5I also illustrates gesture 554 detected on Song 5 506-5 in content items list 504. In response to the detection of gesture 544, Song 5 506-5 is played. For example, playback controls 502 in FIG. 5J shows Song 5 displayed as the content item being played (in its entirety).

Figure 5K:
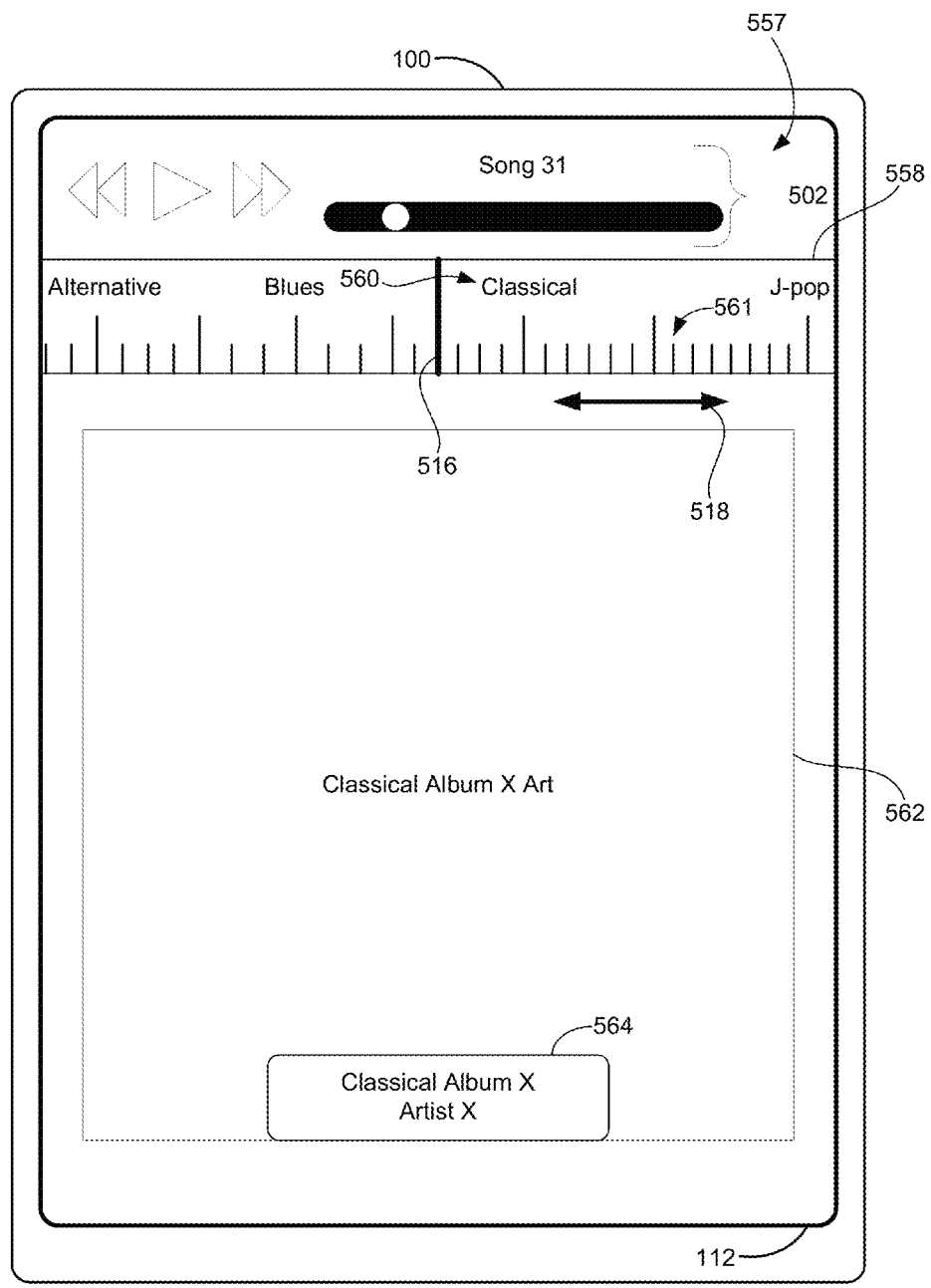
Figure 6A:
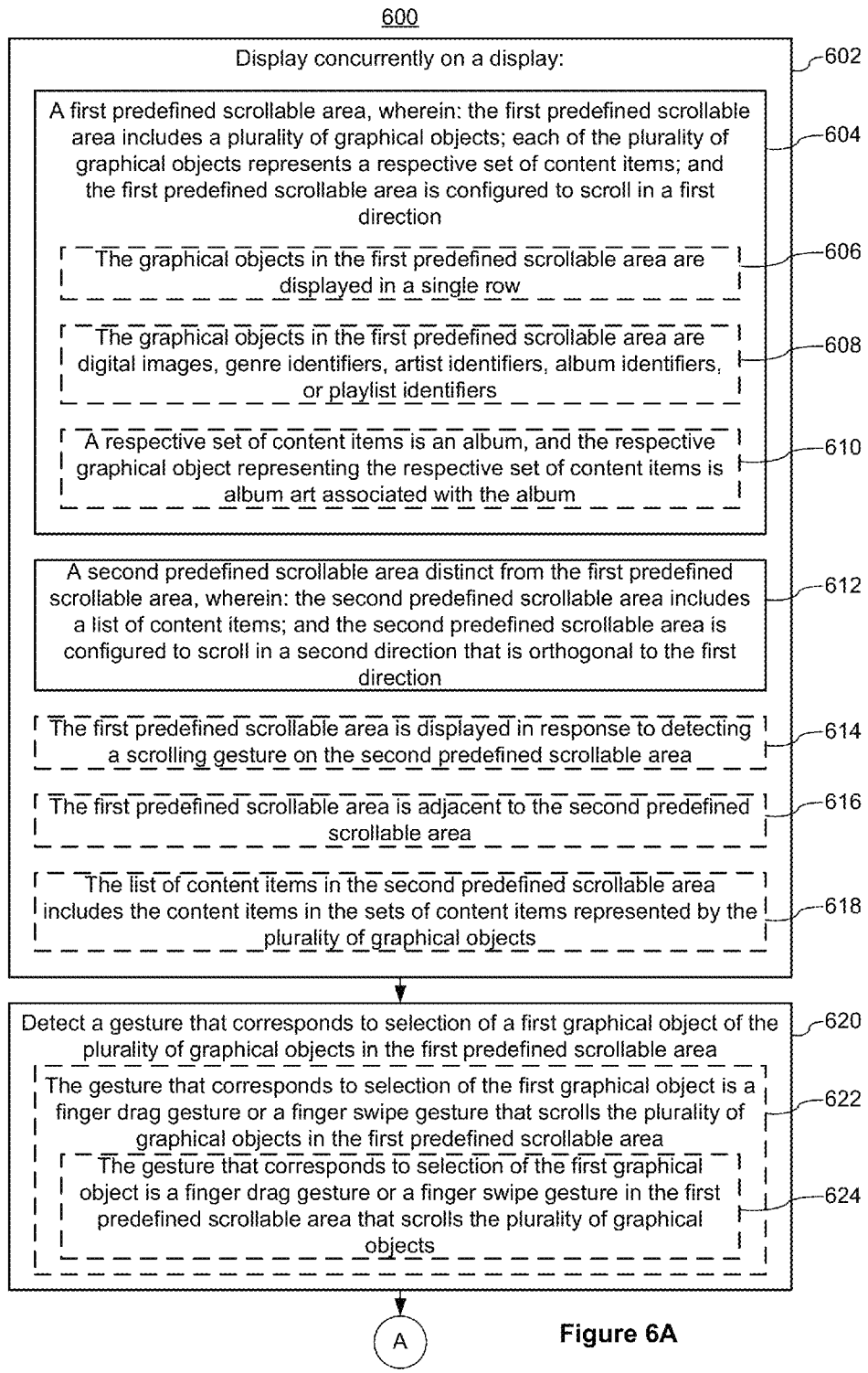
FIGS. 6A-6D are flow diagrams illustrating a method of navigating and previewing content items in accordance with some embodiments.
Figure 6B:
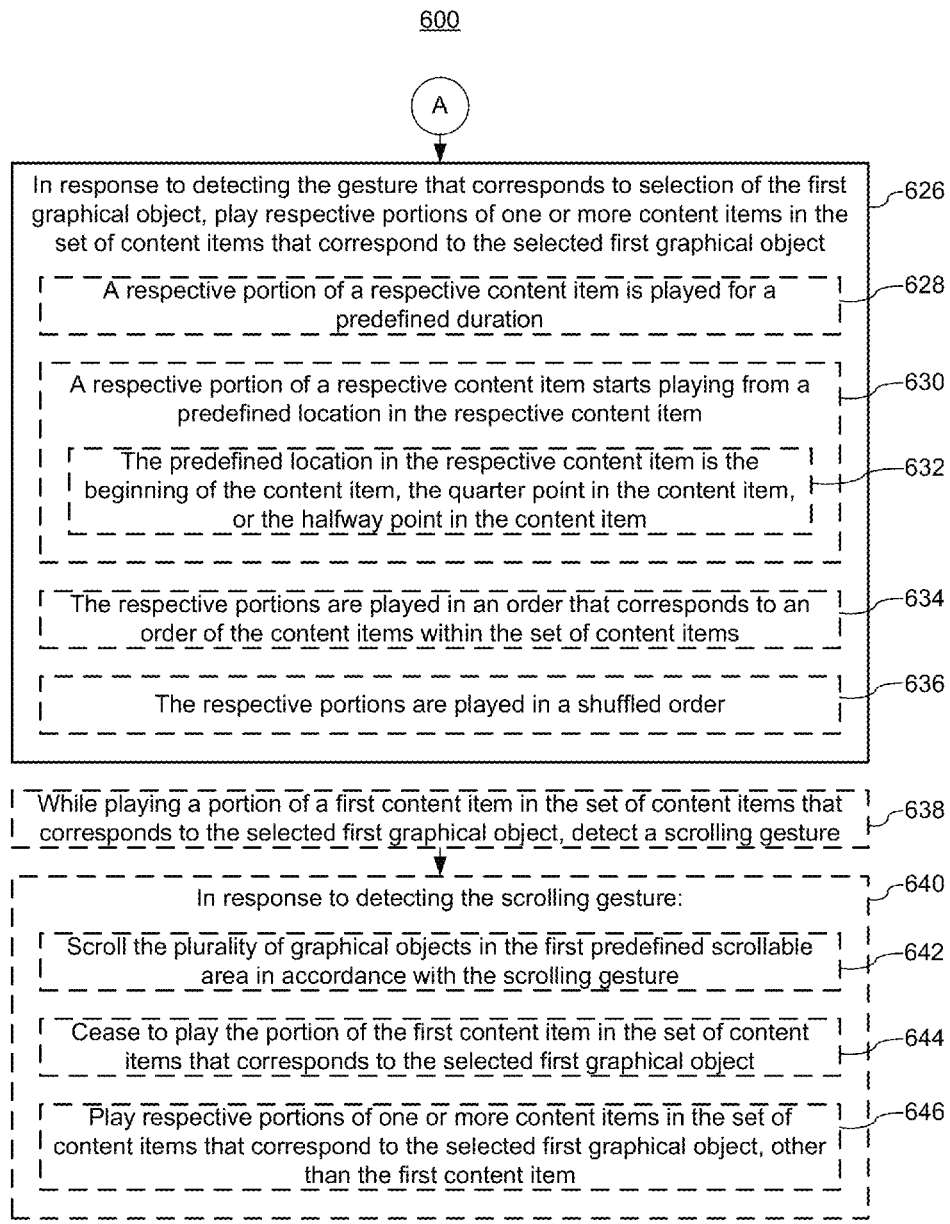
Figure 6C:
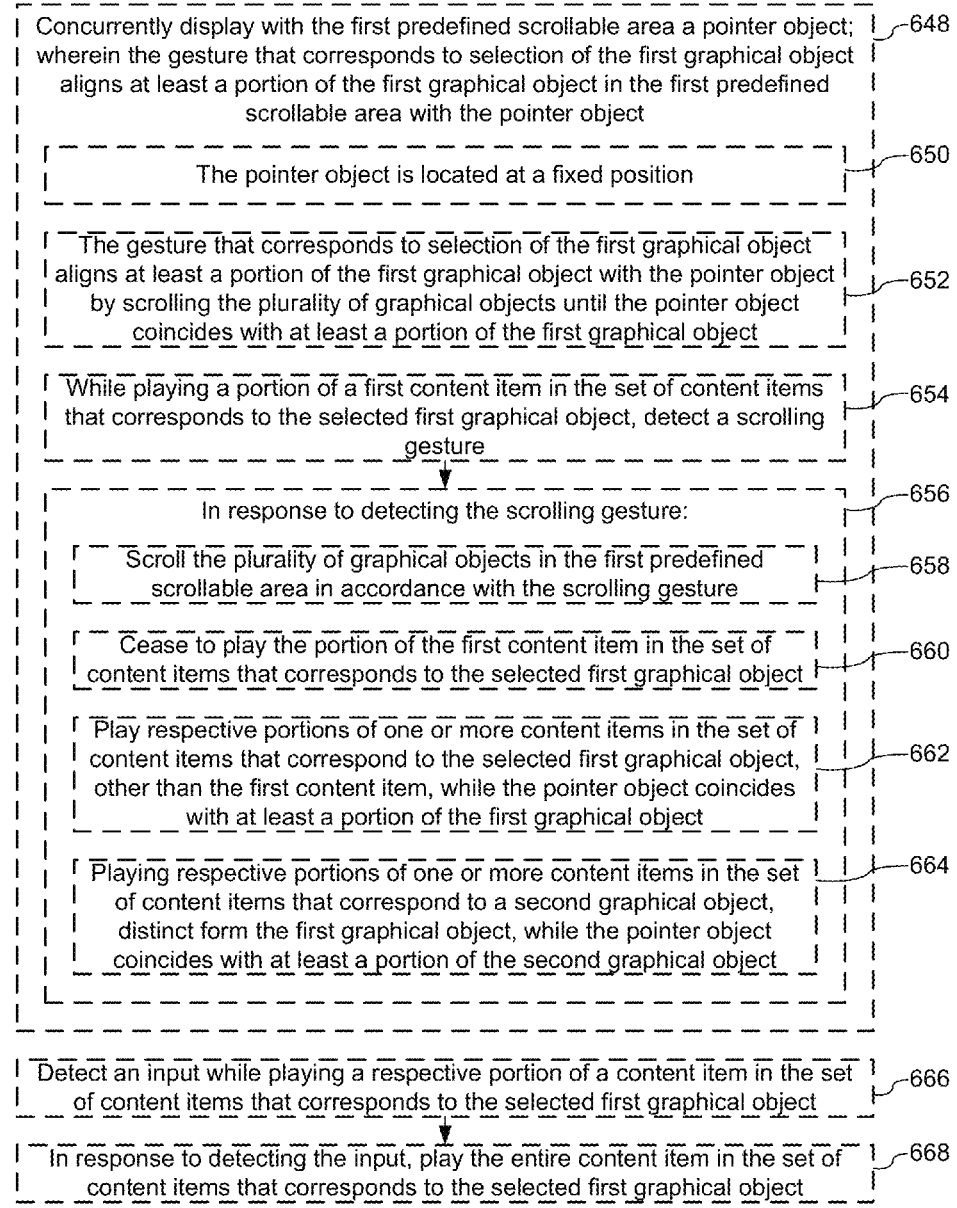
Figure 6D:
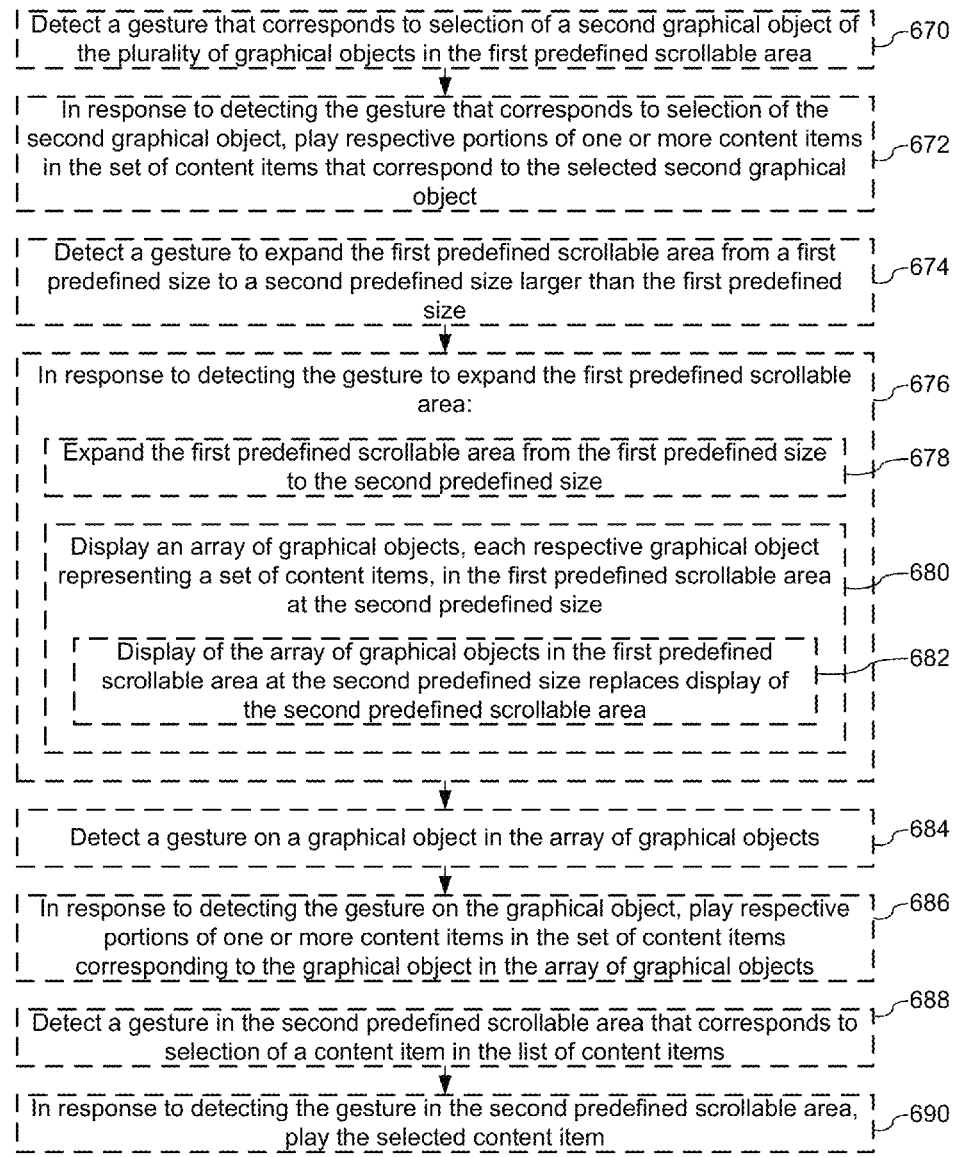
Figure 7A:
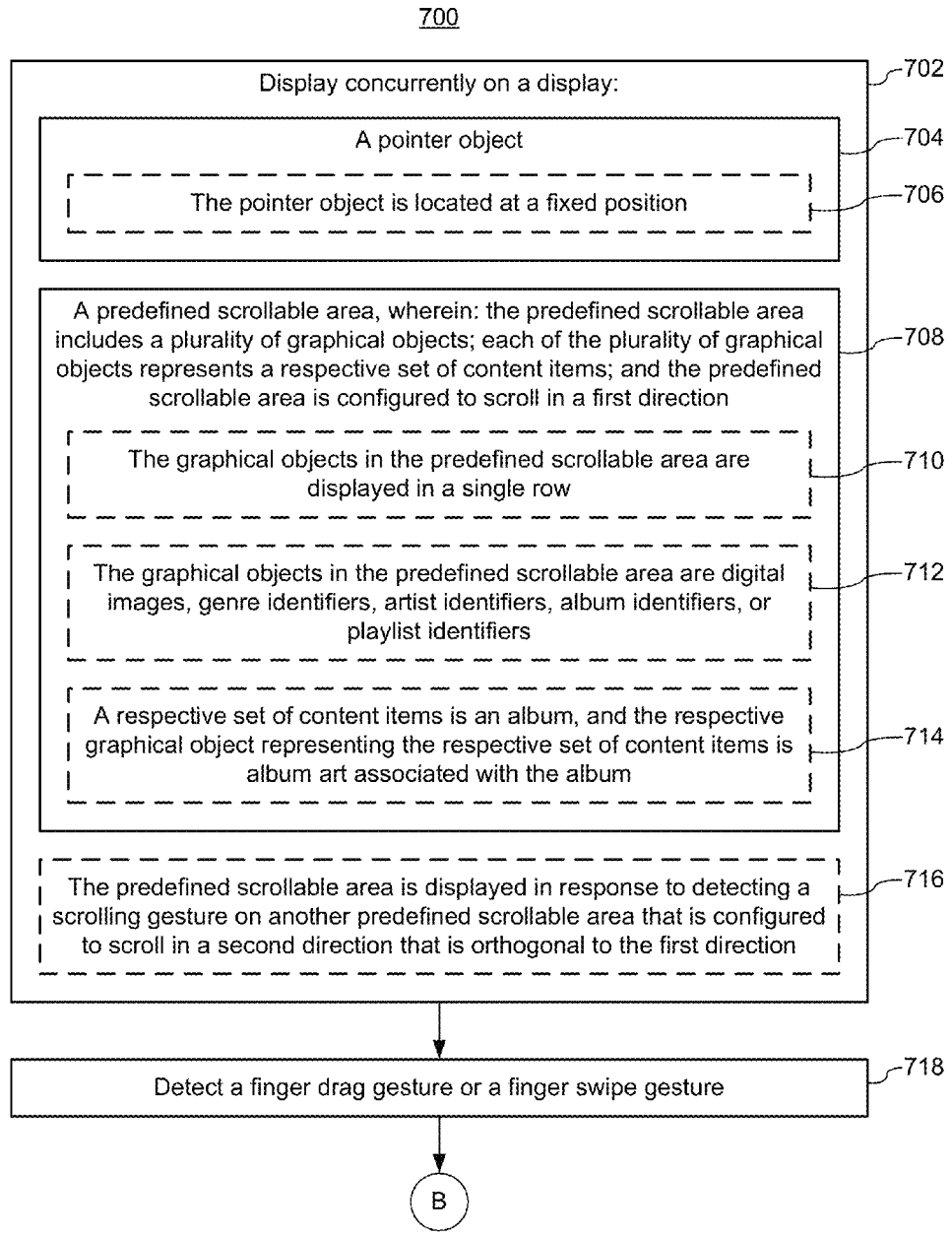
FIGS. 7A-7D are flow diagrams illustrating a method of navigating and previewing content items in accordance with some embodiments.
Figure 7B:
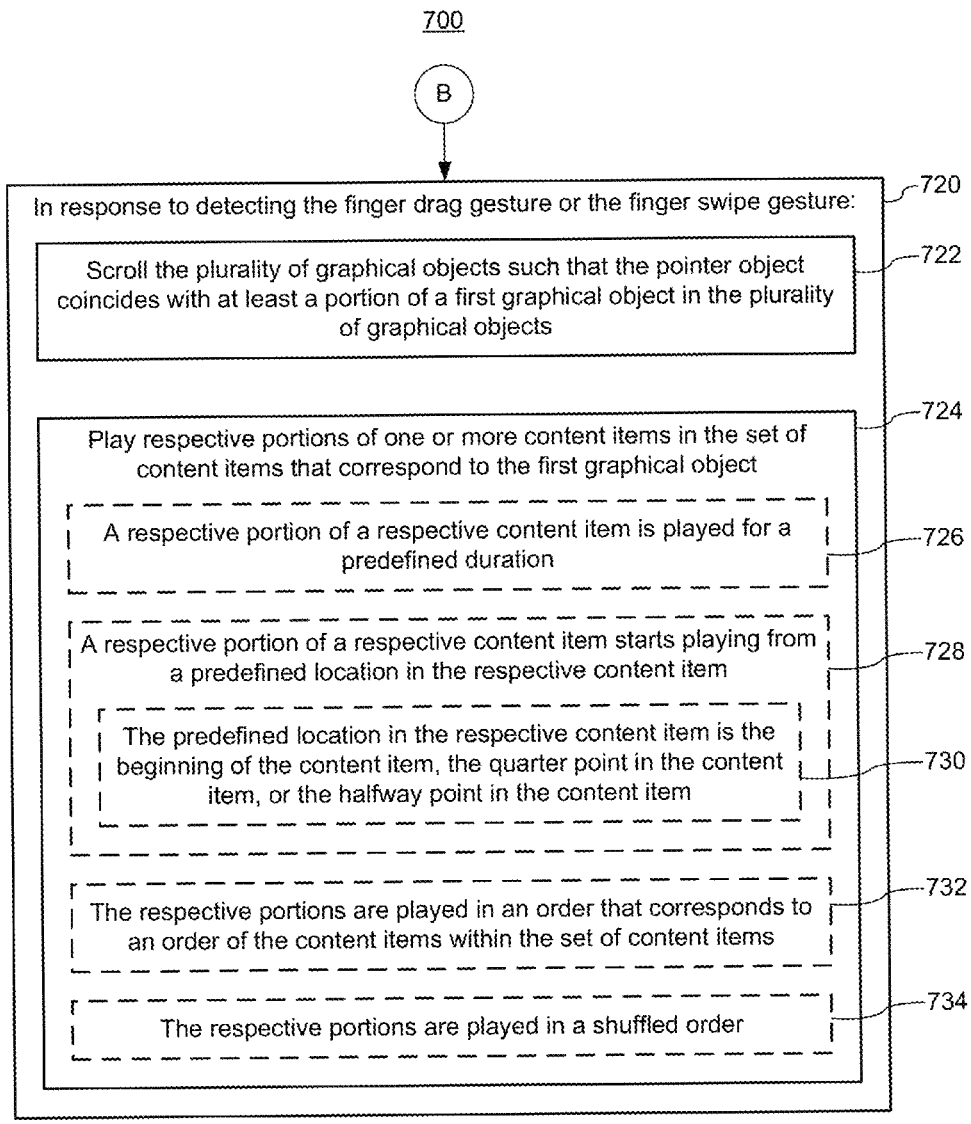
Figure 7C:
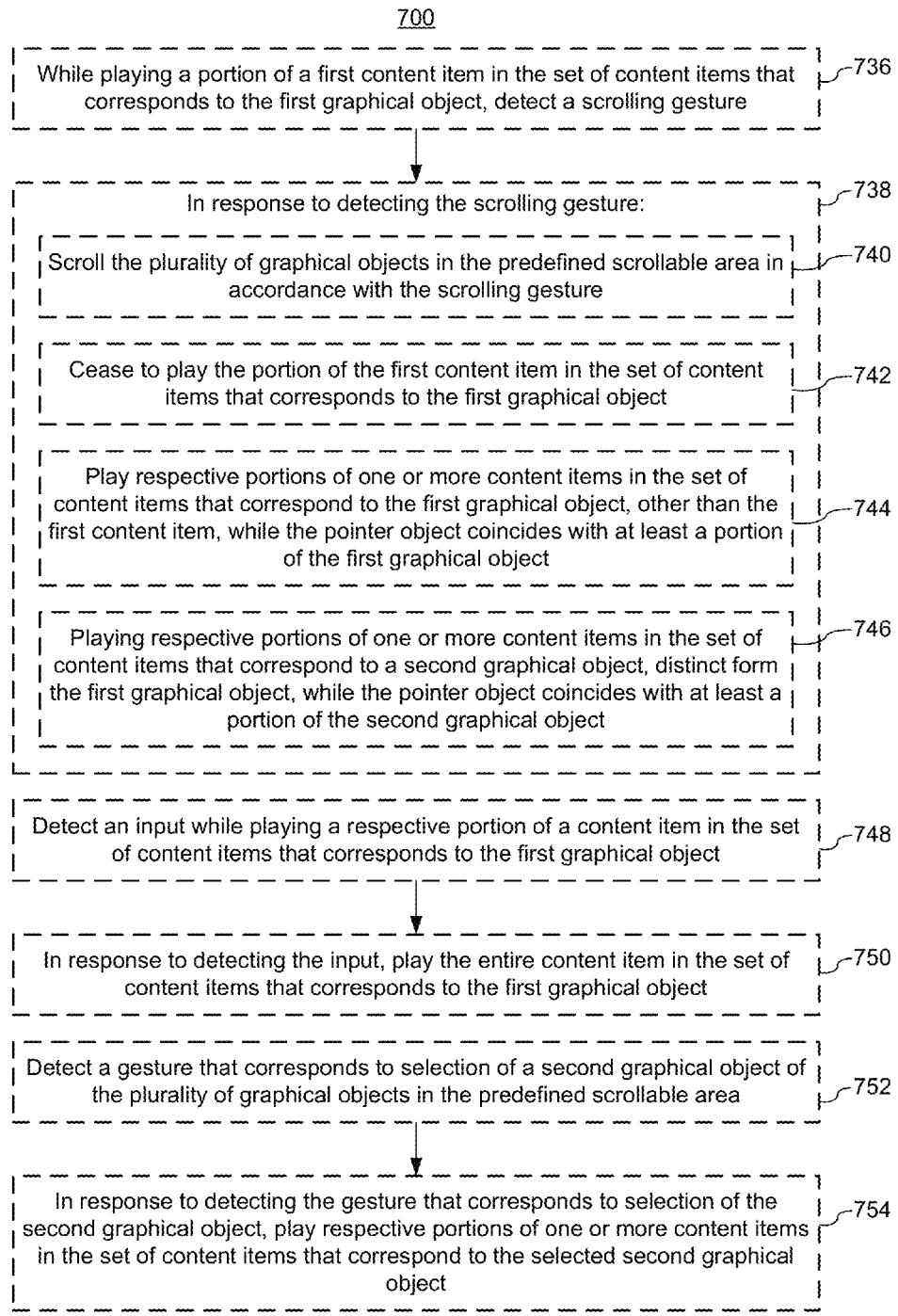
Figure 7D:
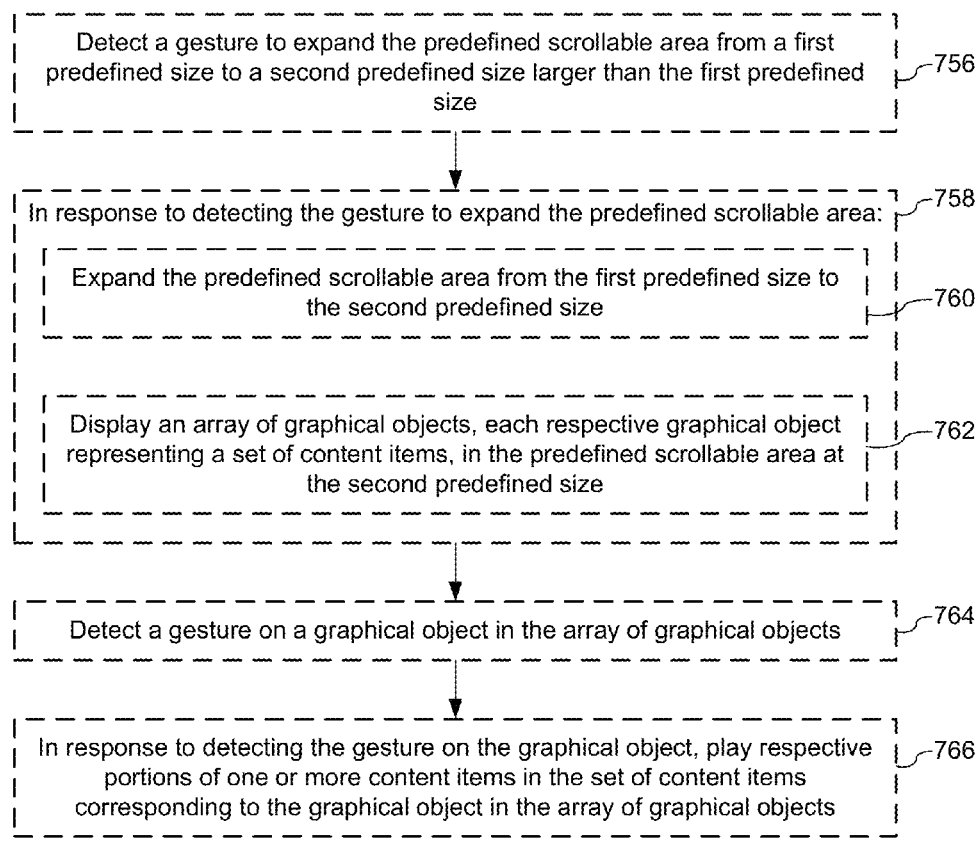

FIG. 5K illustrates a variant content application interface 557. Content application interface 557 includes playback controls 502 and content preview area 558. Content preview area 558 includes genre identifiers 560 (e.g., blues, classical, etc.), pointer object 516, and hash marks 561 corresponding to respective genre identifiers 560. In some embodiments, hash marks 561 correspond to individual sets of content items (e.g., albums) under a respective genre identifier 560. Content preview area 558 may be scrolled parallel to axis 518, as with content preview area 512, to bring a hash mark 561 corresponding to a set of content items into alignment with pointer object 516. Album art 562 and album information 564 corresponding to the album corresponding to the hash mark in alignment with pointer object 516 is displayed in content application interface 557 as well. As different album covers for other albums are displayed in place of album cover 562, the album covers may scroll parallel to axis 518.

FIGS. 6A-6D are flow diagrams illustrating a method 600 of navigating and previewing content items in accordance with some embodiments. The method 600 is performed at an electronic device (e.g., device 300, FIG. 3A, device 300-1, FIG. 3B, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to preview content items. The method reduces the cognitive burden on a user when navigating and previewing content items, thereby creating a more efficient human-machine interface. For battery-operated electronic devices, enabling a user to navigate and preview content items faster and more efficiently conserves power and increases the time between battery charges.

The device displays (602) concurrently on the display a first predefined scrollable area (604) and a second predefined scrollable area (612) distinct from the first predefined scrollable area. The first predefined scrollable area includes a plurality of graphical objects. Each of the plurality of graphical objects represents a respective set of content items. The first predefined scrollable area is configured to scroll in a first direction (e.g., horizontally, from left to right and from right to left). The second predefined scrollable area includes a list of content items. The second predefined scrollable area is configured to scroll in a second direction that is orthogonal to the first direction (e.g., vertically, from top to bottom and from bottom to top).

For example, in FIG. 5B, content preview area 512 (the first predefined scrollable area) and content items list 504 (the second predefined scrollable area) are displayed concurrently. Content preview area 512 includes graphical objects 514. Each graphical object 514 represents a respective set of content items 506. Content preview area 512 is scrollable parallel to axis 518. Content items list 504 includes a list of content items 506 and is scrollable parallel to axis 505, which is orthogonal to axis 518.

In some embodiments, the graphical objects in the first predefined scrollable area are displayed in a single row (606). In FIG. 5B, for example, graphical objects 514 are displayed in a single row in content preview area 512.

In some embodiments, the graphical objects in the first predefined scrollable area are digital images, genre identifiers (e.g., for music genres or movie genres), artist identifiers, album identifiers (e.g., album art), or playlist identifiers (608). For example, in FIG. 5B, graphical objects 514 displayed in content preview area 512 may be album cover or album art images. As another example, in FIG. 5K, genre identifiers 560 are displayed in content preview area 558.

In some embodiments, a respective set of content items is an album, and the respective graphical object representing the respective set of content items is album art associated with the album (610). For example, the sets of content items corresponding to graphical objects 514 are albums, and graphical objects 514 are the corresponding album cover or album art images.

In some embodiments, the first predefined scrollable area is displayed in response to detecting a scrolling gesture on the second predefined scrollable area (e.g., detecting a vertically downward finger drag gesture that scrolls the list of content items to (or beyond) the top of the list of content items) (614). For example, content preview area 512 is displayed in response to the detection of gesture 508 scrolling content items list 504, as shown in FIGS. 5A-5B.

In some embodiments, the first predefined scrollable area is adjacent to the second predefined scrollable area (616). For example, in FIG. 5B, content preview area 512 is adjacent to content items list 504.

In some embodiments, the list of content items in the second predefined scrollable area includes the content items in the sets of content items represented by the plurality of graphical objects (618). For example, content items list 504 in FIG. 5A includes Song 16 506-16, which is also in the set of content items (Album 16) corresponding to graphical object 514-4, as shown in FIG. 5C.

The device detects (620) a gesture that corresponds to selection of a first graphical object of the plurality of graphical objects in the first predefined scrollable area. For example, in response to a scrolling gesture (not shown) scrolling content preview area 512, graphical object 514-4 is selected by aligning graphical object 514-4 with pointer object 516.

In some embodiments, the gesture that corresponds to selection of the first graphical object is a finger drag gesture or a finger swipe gesture that scrolls the plurality of graphical objects in the first predefined scrollable area (622). In some embodiments, a horizontal finger drag or swipe gesture in either the first predefined scrollable area or the second predefined scrollable area will scroll the plurality of graphical objects in the first predefined scrollable area. In some embodiments, a vertical finger drag or swipe gesture in either the first predefined scrollable area or the second predefined scrollable area will scroll the list of content items in the second predefined scrollable area. For example, the gesture that brings graphical object 514-4 into alignment with pointer object 516 in FIG. 5B may be a finger drag or swipe gesture that scrolls graphical objects 514 in content preview area 512.

In some embodiments, the gesture that corresponds to selection of the first graphical object is a finger drag gesture or a finger swipe gesture in the first predefined scrollable area that scrolls the plurality of graphical objects (624). For example, the gesture that brings graphical object 514-4 into alignment with pointer object 516 in FIG. 5B may be a finger drag or swipe gesture in content preview area 512 that scrolls graphical objects 514 in content preview area 512.

In response to detecting the gesture that corresponds to selection of the first graphical object, the device plays (626) respective portions of one or more content items in the set of content items that correspond to the selected first graphical object. For example, in response to the detection of the gesture selecting graphical object 514-4, respective portions of one or more of content items 506-A thru 506-F and 506-16 (FIG. 5C) are played.

In some embodiments, a respective portion of a respective content item is played for a predefined duration (628). A portion of a content item that is played when a graphical object 514 is aligned with pointer object 516 lasts a predefined duration. For example, in FIG. 5B, item 506-A in Album 16 corresponding to graphical object 514-4 is played for a predefined duration (e.g., 30 seconds), then item 506-B in Album 16 is played for the same predefined duration, and so on.

In some embodiments, a respective portion of a respective content item starts playing from a predefined location in the respective content item (630). In some embodiments, the predefined location in the respective content item is the beginning of the content item, the quarter point in the content item, or the halfway point in the content item (632). A portion of a content item that is played when a graphical object 514 is aligned with pointer object 516 starts from a predefined location in the content item. For example, in FIG. 5B, the portion of item 506-A in Album 16 corresponding to graphical object 514-4 that is played may start from the beginning, the quarter point, or the halfway point of item 506-A.

In some embodiments, the respective portions are played in an order that corresponds to an order of the content items within the set of content items (634). For example, for a music album, the respective portions are played in the order of the songs on the album (e.g., from the first song to the last song) or in the order of popularity of the songs on the album (e.g., from the most popular to the least popular). In some embodiments, the popularity is based on the rating for the song (by an individual user or by multiple users) or the total downloads for the song to date or over a period of time. For example, for Album 16 corresponding to graphical object 514-4, items 506-A thru 506-F and 506-16 are played in the album order or in their order of popularity.

In some embodiments, the respective portions are played in a shuffled order (636). For example, for Album 16 corresponding to graphical object 514-4, items 506-A thru 506-F and 506-16 are played in a shuffled (random) order.

In some embodiments, while playing a portion of a first content item in the set of content items that corresponds to the selected first graphical object, the device detects (638) a scrolling gesture (e.g., a horizontal finger drag gesture in the first predefined scrollable area). In response to detecting the scrolling gesture (640), the device scrolls (642) the plurality of graphical objects in the first predefined scrollable area in accordance with the scrolling gesture, ceases to play (644) the portion of the first content item in the set of content items that corresponds to the selected first graphical object, and plays (646) respective portions of one or more content items in the set of content items that correspond to the selected first graphical object, other than the first content item. For example, in FIGS. 5B and 5D, while a portion of a content item from Album 16 corresponding to graphical object 514-4, aligned with pointer object 516, is being played, gesture 520 is detected. In response to the detection of gesture 520, content preview area 512 is scrolled and the content item portion from Album 16 ceases to be played. Portions of other content items from Album 16 are played.

In some embodiments, the device concurrently displays with the first predefined scrollable area a pointer object, where the gesture that corresponds to selection of the first graphical object aligns at least a portion of the first graphical object in the first predefined scrollable area with the pointer object (648). For example, in FIGS. 5B and 5D, pointer object 516 is displayed concurrently with content preview area 512. A scrolling gesture (not shown) selects graphical object 514-4 by scrolling graphical objects 514 in content preview area 512 to align graphical object 514-4 with pointer object 516.

In some embodiments, the pointer object is located at a fixed position (e.g., at a fixed location next to or within in the first predefined scrollable area) (650). For example, in FIG. 5B, pointer object 516 is fixed to be located at the center of content preview area 512. As another example, in FIG. 5K, pointer object 516 is fixed to be located at the center of content preview area 558.

In some embodiments, the gesture that corresponds to selection of the first graphical object aligns at least a portion of the first graphical object with the pointer object by scrolling the plurality of graphical objects until the pointer object coincides with (e.g., overlaps with or points to) at least a portion of the first graphical object (652). For example, in FIGS. 5B and 5D, a scrolling gesture (not shown) selects graphical object 514-4 by scrolling content preview area 512 to align graphical object 514-4 with pointer object 516.

In some embodiments, while playing a portion of a first content item in the set of content items that corresponds to the selected first graphical object, the device detects (654) a scrolling gesture (e.g., a horizontal finger drag gesture in the first predefined scrollable area). In response to detecting the scrolling gesture (656), the device scrolls (658) the plurality of graphical objects in the first predefined scrollable area in accordance with the scrolling gesture; ceases to play (660) the portion of the first content item in the set of content items that corresponds to the selected first graphical object; plays (662) respective portions of one or more content items in the set of content items that correspond to the selected first graphical object, other than the first content item, while the pointer object coincides with (e.g., overlaps with or points to) at least a portion of the first graphical object; and plays (664) respective portions of one or more content items in the set of content items that correspond to a second graphical object, distinct from the first graphical object, while the pointer object coincides with (e.g., overlaps with or points to) at least a portion of the second graphical object. For example, in FIGS. 5B and 5D, while a portion of a content item from Album 16 corresponding to graphical object 514-4, aligned with pointer object 516, is being played, gesture 520 is detected. In response to the detection of gesture 520, content preview area 512 is scrolled and the content item portion from Album 16 ceases to be played. Portions of other content items from Album 16 are played when graphical object 514-4 is still aligned with pointer object 516 while graphical objects 514 in content preview area 512 are scrolling. Then portions of content items corresponding to graphical object 514-3 are played when graphical object 514-3 is aligned with pointer object 516 while graphical objects 514 in content preview area 512 are scrolling. Then portions of content items from Album A corresponding to graphical object 514-2 are played when graphical object 514-2 is aligned with pointer object 516 while graphical objects 514 in content preview area 512 are scrolling.

In some embodiments, the device detects (666) an input while playing a respective portion of a content item in the set of content items that corresponds to the selected first graphical object (e.g., a tap gesture on the pointer object, a tap gesture on the first graphical object, a double tap gesture anywhere on the touch-sensitive surface, or any other similar gesture). In response to detecting the input, the device plays (668) the entire content item in the set of content items that corresponds to the selected first graphical object. For example, in FIGS. 5E-5F, while a portion of Song A 506-A in Album 16, corresponding to graphical object 514-4 aligned with pointer object 516 is playing, gesture 544 is detected on pointer object 516 (and on graphical object 514-4). In response to the detection of gesture 544, Song A 506-A is played in its entirety, as shown in FIG. 5F where playback controls 502 shows Song A 506-A as being played in its entirety, rather than just playing a preview.

In some embodiments, the device detects (670) a gesture that corresponds to selection of a second graphical object of the plurality of graphical objects in the first predefined scrollable area. In response to detecting the gesture that corresponds to selection of the second graphical object, the device plays (672) respective portions of one or more content items in the set of content items that correspond to the selected second graphical object. For example, in FIGS. 5B and 5D, gesture 520 is detected. In response to the detection of gesture 520, graphical objects 514 in content preview area 512 are scrolled and graphical object 514-2 is selected by aligning graphical object 514-2 is aligned with pointer object 516. Portions of content items from Album A corresponding to graphical object 514-2 are played.

In some embodiments, the device detects (674) a gesture to expand the first predefined scrollable area from a first predefined size to a second predefined size larger than the first predefined size (e.g., a finger drag or finger swipe gesture orthogonal to the first direction, which starts in the first predefined scrollable area). In response to detecting the gesture to expand the first predefined scrollable area (676), the device expands (678) the first predefined scrollable area from the first predefined size to the second predefined size, and displays (680) an array of graphical objects, each respective graphical object representing a set of content items, in the first predefined scrollable area at the second predefined size. For example, in FIGS. 5F-5H, gesture 546 is detected. In response to the detection of gesture 546, content preview area 512 is expanded from a single-row size to a larger, multi-row size with an array of graphical objects 514.

In some embodiments, display of the array of graphical objects in the first predefined scrollable area at the second predefined size replaces display of the second predefined scrollable area (682). For example, in FIG. 5H, content preview area 512 at the multi-row size replaces display of content items list 504.

In some embodiments, the device detects (684) a gesture on a graphical object in the array of graphical objects. In response to detecting the gesture on the graphical object, the device plays (686) respective portions of one or more content items in the set of content items corresponding to the graphical object in the array of graphical objects. For example, in FIG. 5H, gesture 552 is detected on graphical object 514-2 in expanded content preview area 512. In response to the detection of gesture 552, respective portions of one or more content items 506-H thru 506-N in Album A corresponding to graphical object 514-2 are played.

In some embodiments, the device detects (688) a gesture in the second predefined scrollable area that corresponds to selection of a content item in the list of content items. In response to detecting the gesture in the second predefined scrollable area, the device plays (690) the selected content item. For example, in FIG. 5I, gesture 554 is detected on Song 5 506-5 in content items list 504. In response to the detection of gesture 554, Song 5 506-5 is played in its entirety, as opposed to just playing a preview.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein.

Additionally, it should be noted that details of other processes described herein with respect to method 700 (e.g., FIGS. 7A-7D) are also applicable in an analogous manner to method 600 described above with respect to FIGS. 6A-6D. For example, the first predefined scrollable area described above with reference to method 600 may have one or more of the characteristics of the predefined scrollable area described herein with reference to method 700. For brevity, these details are not repeated here.

FIGS. 7A-7D are flow diagrams illustrating a method 700 of previewing content items in accordance with some embodiments. The method 700 is performed at an electronic device (e.g., device 300, FIG. 3A, device 300-1, FIG. 3B, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to preview content items. The method reduces the cognitive burden on a user when navigating and previewing content items, thereby creating a more efficient human-machine interface. For battery-operated electronic devices, enabling a user to navigate and preview content items faster and more efficiently conserves power and increases the time between battery charges.

The device displays (702) concurrently on the display a pointer object (704) and a predefined scrollable area (708). The predefined scrollable area includes a plurality of graphical objects. Each of the plurality of graphical objects represents a respective set of content items. The predefined scrollable area is configured to scroll in a first direction (e.g., horizontally, from left to right and from right to left). For example, in FIG. 5B, content preview area 512 (the predefined scrollable area) and pointer object 516 are displayed concurrently. Content preview area 512 includes graphical objects 514. Each graphical object 514 represents a respective set of content items 506. Content preview area 512 is scrollable parallel to axis 518.

In some embodiments, the pointer object is located at a fixed position (e.g., at a fixed location next to or within in the predefined scrollable area) (706). For example, in FIG. 5B, pointer object 516 is fixed to be located at the center of content preview area 512. Similarly, in FIG. 5K, pointer object 516 is fixed to be located at the center of content preview area 558.

In some embodiments, the graphical objects in the predefined scrollable area are displayed in a single row (710). In FIG. 5B, for example, graphical objects 514 are displayed in a single row in content preview area 512.

In some embodiments, the graphical objects in the predefined scrollable area are digital images, genre identifiers, artist identifiers, album identifiers (e.g., album art), or playlist identifiers (712). For example, in FIG. 5B, graphical objects 514 displayed in content preview area 512 may be album cover or album art images. As another example, in FIG. 5K, genre identifiers 560 are displayed in content preview area 558.

In some embodiments, a respective set of content items is an album, and the respective graphical object representing the respective set of content items is album art associated with the album (714). For example, the sets of content items corresponding to graphical objects 514 are albums, and graphical objects 514 are the corresponding album cover or album art images.

In some embodiments, the predefined scrollable area is displayed in response to detecting a scrolling gesture on another predefined scrollable area that is configured to scroll in a second direction that is orthogonal to the first direction (e.g., vertically, from top to bottom and from bottom to top) (716). For example, content preview area 512 is displayed in response to the detection of gesture 508 scrolling content items list 504, as shown in FIGS. 5A-5B. Gesture 508 scrolls content items list 504 parallel to axis 505, which is orthogonal to axis 518.

The device detects a finger drag gesture or a finger swipe gesture (e.g., at a location on the touch-sensitive surface that corresponds to the predefined scrollable area) (718). For example, a finger drag or swipe gesture (not shown) parallel to axis 518 is detected in content preview area 512.

In response to detecting the finger drag gesture or the finger swipe gesture (720), the device scrolls (722) the plurality of graphical objects such that the pointer object coincides with (e.g., overlaps with or points to) at least a portion of a first graphical object in the plurality of graphical objects, and plays (724) respective portions of one or more content items in the set of content items that correspond to the first graphical object. For example, in response to the detection of the finger drag or swipe gesture (not shown), graphical objects 514 in content preview area 512 scroll to align graphical object 514-4 with pointer object 516, as shown in FIG. 5B. In response to the alignment of graphical object 514-4 with pointer object 516, respective portions of one or more of items 506-A thru 506-F and 506-16 in Album 16 are played.

In some embodiments, a respective portion of a respective content item is played for a predefined duration (726). A portion of a content item that is played when a graphical object 514 is aligned with pointer object 516 lasts a predefined duration. For example, in FIG. 5B, item 506-A in Album 16 corresponding to graphical object 514-4 is played for a predefined duration (e.g., 30 seconds), then item 506-B in Album 16 is played for the same predefined duration, and so on.

In some embodiments, a respective portion of a respective content item starts playing from a predefined location in the respective content item (728). In some embodiments, the predefined location in the respective content item is the beginning of the content item, the quarter point in the content item, or the halfway point in the content item (730). A portion of a content item that is played when a graphical object 514 is aligned with pointer object 516 starts from a predefined location in the content item. For example, in FIG. 5B, the portion of item 506-A in Album 16 corresponding to graphical object 514-4 that is played may start from the beginning, the quarter point, or the halfway point of item 506-A.

In some embodiments, the respective portions are played in an order that corresponds to an order of the content items within the set of content items. For example, for a music album, the respective portions are played in the order of the songs on the album (e.g., from the first song to the last song) or in the order of popularity of the songs on the album (e.g., from the most popular to the least popular). In some embodiments, the popularity is based on the rating for the song (by an individual user or by multiple users) or the total downloads for the song to date or over a period of time. For example, for Album 16 corresponding to graphical object 514-4, items 506-A thru 506-F and 506-16 are played in the album order or in their order of popularity.

In some embodiments, the respective portions are played in a shuffled order. For example, for Album 16 corresponding to graphical object 514-4, items 506-A thru 506-F and 506-16 are played in a shuffled (random) order.

In some embodiments, while playing a portion of a first content item in the set of content items that corresponds to the first graphical object, the device detects (736) a scrolling gesture (e.g., a horizontal finger drag gesture at a location on the touch-sensitive surface that corresponds to the predefined scrollable area). In response to detecting the scrolling gesture (738), the device scrolls (740) the plurality of graphical objects in the predefined scrollable area in accordance with the scrolling gesture and ceases (742) to play the portion of the first content item in the set of content items that corresponds to the first graphical object. The device plays (744) respective portions of one or more content items in the set of content items that correspond to the first graphical object, other than the first content item, while the pointer object coincides with (e.g., overlaps with or points to) at least a portion of the first graphical object. The device plays (746) respective portions of one or more content items in the set of content items that correspond to a second graphical object, distinct from the first graphical object, while the pointer object coincides with (e.g., overlaps with or points to) at least a portion of the second graphical object. For example, in FIGS. 5B and 5D, while a portion of a content item from Album 16 corresponding to graphical object 514-4, aligned with pointer object 516, is being played, gesture 520 is detected. In response to the detection of gesture 520, graphical objects 514 in content preview area 512 are scrolled and the content item portion from Album 16 ceases to be played. Portions of other content items from Album 16 are played when graphical object 514-4 is still aligned with pointer object 516 while graphical objects 514 in content preview area 512 are scrolling. Then portions of content items corresponding to graphical object 514-3 are played when graphical object 514-3 is aligned with pointer object 516 while graphical objects 514 in content preview area 512 are scrolling. Then portions of content items from Album A corresponding to graphical object 514-2 are played when graphical object 514-2 is aligned with pointer object 516 while graphical objects 514 in content preview area 512 are scrolling.

In some embodiments, the device detects (748) an input while playing a respective portion of a content item in the set of content items that corresponds to the first graphical object (e.g., a tap gesture on the pointer object, a tap gesture on the first graphical object, a double tap gesture anywhere on the touch-sensitive surface, or any other similar gesture). In response to detecting the input, the device plays (750) the entire content item in the set of content items that corresponds to the first graphical object. For example, in FIGS. 5E-5F, while a portion of Song A 506-A in Album 16, corresponding to graphical object 514-4 aligned with pointer object 516 is playing, gesture 544 is detected on pointer object 516 (and on graphical object 514-4). In response to the detection of gesture 544, Song A 506-A is played in its entirety, as shown in FIG. 5F where playback controls 502 shows Song A 506-A as being played in its entirety, rather than just playing a preview.

In some embodiments, the device detects (752) a gesture that corresponds to selection of a second graphical object of the plurality of graphical objects in the predefined scrollable area (e.g., another finger drag or finger swipe gesture). In response to detecting the gesture that corresponds to selection of the second graphical object, the device plays (754) respective portions of one or more content items in the set of content items that correspond to the selected second graphical object. For example, in FIGS. 5B and 5D, gesture 520 is detected. In response to the detection of gesture 520, graphical objects 514 in content preview area 512 are scrolled and graphical object 514-2 is selected by aligning graphical object 514-2 is aligned with pointer object 516. Portions of content items from Album A corresponding to graphical object 514-2 are played.

In some embodiments, the device detects (756) a gesture to expand the predefined scrollable area from a first predefined size to a second predefined size larger than the first predefined size (e.g., a finger drag or finger swipe gesture orthogonal to the first direction, which starts in the predefined scrollable area). In response to detecting the gesture to expand the predefined scrollable area (758), the device expands (760) the predefined scrollable area from the first predefined size to the second predefined size, and displays (762) an array of graphical objects, each respective graphical object representing a set of content items, in the predefined scrollable area at the second predefined size. For example, in FIGS. 5F-5H, gesture 546 is detected. In response to the detection of gesture 546, content preview area 512 is expanded from a single-row size to a larger, multi-row size with an array of graphical objects 514.

In some embodiments, the device detects (764) a gesture on a graphical object in the array of graphical objects. In response to detecting the gesture on the graphical object, the device plays (766) respective portions of one or more content items in the set of content items corresponding to the graphical object in the array of graphical objects. For example, in FIG. 5H, gesture 552 is detected on graphical object 514-2 in expanded content preview area 512. In response to the detection of gesture 552, respective portions of content items 506-H thru 506-N in Album A corresponding to graphical object 514-2 are played.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 600 (e.g., FIGS. 6A-6D) are also applicable in an analogous manner to method 700 described above with respect to FIGS. 7A-7D. For example, the predefined scrollable area described above with reference to method 700 may have one or more of the characteristics of the first predefined scrollable area described herein with reference to method 600. For brevity, these details are not repeated here.

Figure 8:
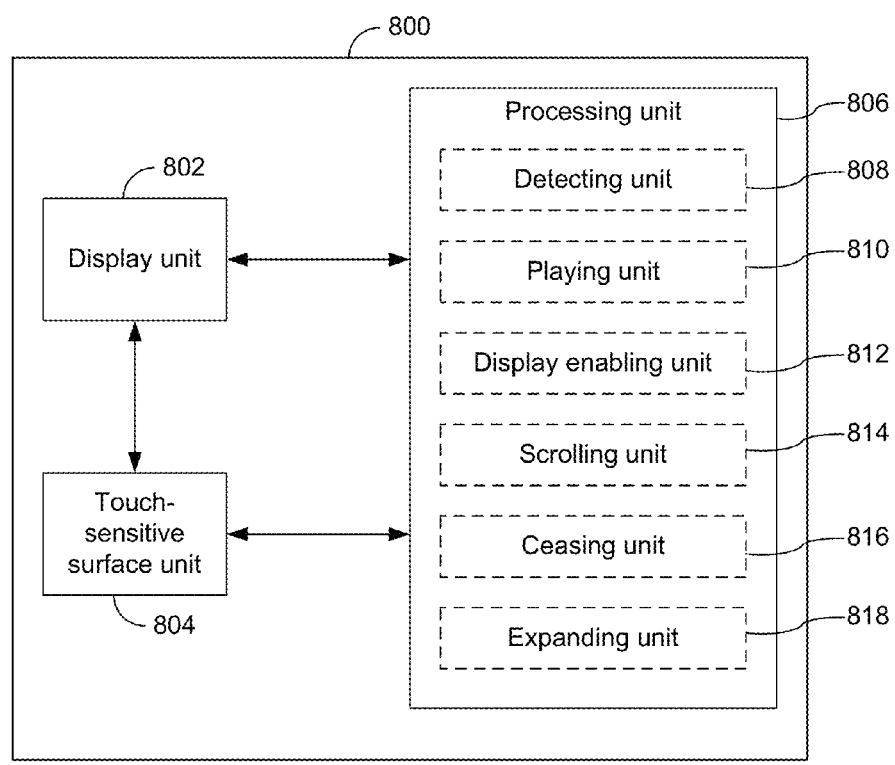
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, an electronic device 800 includes a display unit 802 configured to display concurrently on the display unit 802 a first predefined scrollable area and a second predefined scrollable area distinct from the first predefined scrollable area. The first predefined scrollable area includes a plurality of graphical objects. Each of the plurality of graphical objects represents a respective set of content items. The first predefined scrollable area is configured to scroll in a first direction. The second predefined scrollable area includes a list of content items. The second predefined scrollable area is configured to scroll in a second direction that is orthogonal to the first direction. Electronic device 800 also includes a touch-sensitive surface unit 804 configured to receive gestures, and a processing unit 806 coupled to the display unit 802 and the touch-sensitive surface unit 804. In some embodiments, the processing unit 806 includes a detecting unit 808, a playing unit 810, a display enabling unit 812, a scrolling unit 814, a ceasing unit 816, and an expanding unit 818.

The processing unit 806 is configured to: detect a gesture that corresponds to selection of a first graphical object of the plurality of graphical objects in the first predefined scrollable area (e.g., with the detecting unit 808); and, in response to detecting the gesture that corresponds to selection of the first graphical object, play respective portions of one or more content items in the set of content items that correspond to the selected first graphical object (e.g., with the playing unit 810).

In some embodiments, the graphical objects in the first predefined scrollable area are displayed in a single row.

In some embodiments, the graphical objects in the first predefined scrollable area are digital images, genre identifiers, artist identifiers, album identifiers, or playlist identifiers.

In some embodiments, a respective set of content items is an album, and the respective graphical object representing the respective set of content items is album art associated with the album.

In some embodiments, the first predefined scrollable area is displayed in response to detecting a scrolling gesture on the second predefined scrollable area.

In some embodiments, wherein the first predefined scrollable area is adjacent to the second predefined scrollable area.

In some embodiments, the list of content items in the second predefined scrollable area includes the content items in the sets of content items represented by the plurality of graphical objects.

In some embodiments, the gesture that corresponds to selection of the first graphical object is a finger drag gesture or a finger swipe gesture that scrolls the plurality of graphical objects in the first predefined scrollable area.

In some embodiments, the gesture that corresponds to selection of the first graphical object is a finger drag gesture or a finger swipe gesture in the first predefined scrollable area that scrolls the plurality of graphical objects.

In some embodiments, the processing unit 806 is configured to enable display of a pointer object concurrently with the first predefined scrollable area (e.g., with the display enabling unit 812), where the gesture that corresponds to selection of the first graphical object aligns at least a portion of the first graphical object in the first predefined scrollable area with the pointer object.

In some embodiments, the pointer object is located at a fixed position.

In some embodiments, the gesture that corresponds to selection of the first graphical object aligns at least a portion of the first graphical object with the pointer object by scrolling the plurality of graphical objects until the pointer object coincides with at least a portion of the first graphical object.

In some embodiments, a respective portion of a respective content item is played for a predefined duration.

In some embodiments, a respective portion of a respective content item starts playing from a predefined location in the respective content item.

In some embodiments, the predefined location in the respective content item is the beginning of the content item, the quarter point in the content item, or the halfway point in the content item.

In some embodiments, the respective portions are played in an order that corresponds to an order of the content items within the set of content items.

In some embodiments, the respective portions are played in a shuffled order.

In some embodiments, the processing unit 806 is configured to: while playing a portion of a first content item in the set of content items that corresponds to the selected first graphical object, detect a scrolling gesture (e.g., with the detecting unit 808); and, in response to detecting the scrolling gesture: scroll the plurality of graphical objects in the first predefined scrollable area in accordance with the scrolling gesture (e.g., with the scrolling unit 814), cease to play the portion of the first content item in the set of content items that corresponds to the selected first graphical object (e.g., with the ceasing unit 816), and play respective portions of one or more content items in the set of content items that correspond to the selected first graphical object, other than the first content item (e.g., with the playing unit 810).

In some embodiments, the processing unit 806 is configured to: while playing a portion of a first content item in the set of content items that corresponds to the selected first graphical object, detect a scrolling gesture (e.g., with the detecting unit 808); and, in response to detecting the scrolling gesture: scroll the plurality of graphical objects in the first predefined scrollable area in accordance with the scrolling gesture (e.g., with the scrolling unit 814), cease to play the portion of the first content item in the set of content items that corresponds to the selected first graphical object (e.g., with the ceasing unit 816), play respective portions of one or more content items in the set of content items that correspond to the selected first graphical object, other than the first content item, while the pointer object coincides with at least a portion of the first graphical object (e.g., with the playing unit 810), and play respective portions of one or more content items in the set of content items that correspond to a second graphical object, distinct from the first graphical object, while the pointer object coincides with at least a portion of the second graphical object (e.g., with the playing unit 810).

In some embodiments, the processing unit 806 is configured to: detect an input while playing a respective portion of a content item in the set of content items that corresponds to the selected first graphical object (e.g., with the detecting unit 808); and, in response to detecting the input, play the entire content item in the set of content items that corresponds to the selected first graphical object (e.g., with the playing unit 810).

In some embodiments, the processing unit 806 is configured to: detect a gesture that corresponds to selection of a second graphical object of the plurality of graphical objects in the first predefined scrollable area (e.g., with the detecting unit 808); and in response to detecting the gesture that corresponds to selection of the second graphical object, play respective portions of one or more content items in the set of content items that correspond to the selected second graphical object (e.g., with the playing unit 810).

In some embodiments, the processing unit 806 is configured to: detect a gesture to expand the first predefined scrollable area from a first predefined size to a second predefined size larger than the first predefined size (e.g., with the detecting unit 808); and in response to detecting the gesture to expand the first predefined scrollable area: expand the first predefined scrollable area from the first predefined size to the second predefined size (e.g., with the expanding unit 818), and enable display of an array of graphical objects, each respective graphical object representing a set of content items, in the first predefined scrollable area at the second predefined size (e.g., with the display enabling unit 812).

In some embodiments, display of the array of graphical objects in the first predefined scrollable area at the second predefined size replaces display of the second predefined scrollable area.

In some embodiments, the processing unit 806 is configured to: detect a gesture on a graphical object in the array of graphical objects (e.g., with the detecting unit 808); and, in response to detecting the gesture on the graphical object, play respective portions of one or more content items in the set of content items corresponding to the graphical object in the array of graphical objects (e.g., with the playing unit 810).

In some embodiments, the processing unit 806 is configured to: detect a gesture in the second predefined scrollable area that corresponds to selection of a content item in the list of content items (e.g., with the detecting unit 808); and in response to detecting the gesture in the second predefined scrollable area, play the selected content item (e.g., with the playing unit 810).

In accordance with some embodiments, an electronic device 800 includes a display unit 802 configured to display concurrently on the display unit 802 a pointer object and a predefined scrollable area. The predefined scrollable area includes a plurality of graphical objects. Each of the plurality of graphical objects represents a respective set of content items. The predefined scrollable area is configured to scroll in a first direction. Electronic device 800 also includes a touch-sensitive surface unit 804 configured to receive gestures, and a processing unit 806 coupled to the display unit 802 and the touch-sensitive surface unit 804. In some embodiments, the processing unit 806 includes a detecting unit 808, a playing unit 810, a display enabling unit 812, a scrolling unit 814, a ceasing unit 816, and an expanding unit 818.

The processing unit 806 is configured to: detect a finger drag gesture or a finger swipe gesture (e.g., with the detecting unit 808); and, in response to detecting the finger drag gesture or the finger swipe gesture: scroll the plurality of graphical objects such that the pointer object coincides with at least a portion of a first graphical object in the plurality of graphical objects (e.g., with the scrolling unit 814), and play respective portions of one or more content items in the set of content items that correspond to the first graphical object (e.g., with the playing unit 810).

In some embodiments, the graphical objects in the predefined scrollable area are displayed in a single row.

In some embodiments, the graphical objects in the predefined scrollable area are digital images, genre identifiers, artist identifiers, album identifiers, or playlist identifiers.

In some embodiments, a respective set of content items is an album, and the respective graphical object representing the respective set of content items is album art associated with the album.

In some embodiments, the predefined scrollable area is displayed in response to detecting a scrolling gesture on another predefined scrollable area that is configured to scroll in a second direction that is orthogonal to the first direction.

In some embodiments, the pointer object is located at a fixed position.

In some embodiments, a respective portion of a respective content item is played for a predefined duration.

In some embodiments, a respective portion of a respective content item starts playing from a predefined location in the respective content item.

In some embodiments, the predefined location in the respective content item is the beginning of the content item, the quarter point in the content item, or the halfway point in the content item.

In some embodiments, the respective portions are played in an order that corresponds to an order of the content items within the set of content items.

In some embodiments, the respective portions are played in a shuffled order.

In some embodiments, the processing unit 806 is configured to: while playing a portion of a first content item in the set of content items that corresponds to the first graphical object, detect a scrolling gesture (e.g., with the detecting unit 808); and, in response to detecting the scrolling gesture: scroll the plurality of graphical objects in the predefined scrollable area in accordance with the scrolling gesture (e.g., with the scrolling unit 814), cease to play the portion of the first content item in the set of content items that corresponds to the first graphical object (e.g., with the ceasing unit 816), play respective portions of one or more content items in the set of content items that correspond to the first graphical object, other than the first content item, while the pointer object coincides with at least a portion of the first graphical object (e.g., with the playing unit 810), and play respective portions of one or more content items in the set of content items that correspond to a second graphical object, distinct from the first graphical object, while the pointer object coincides with at least a portion of the second graphical object (e.g., with the playing unit 810).

In some embodiments, the processing unit 806 is configured to: detect an input while playing a respective portion of a content item in the set of content items that corresponds to the first graphical object (e.g., with the detecting unit 808); and, in response to detecting the input, play the entire content item in the set of content items that corresponds to the first graphical object (e.g., with the playing unit 810).

In some embodiments, the processing unit 806 is configured to: detect a gesture that corresponds to selection of a second graphical object of the plurality of graphical objects in the predefined scrollable area (e.g., with the detecting unit 808); and in response to detecting the gesture that corresponds to selection of the second graphical object, play respective portions of one or more content items in the set of content items that correspond to the selected second graphical object (e.g., with the playing unit 810).

In some embodiments, the processing unit 806 is configured to: detect a gesture to expand the predefined scrollable area from a first predefined size to a second predefined size larger than the first predefined size (e.g., with the detecting unit 808); and in response to detecting the gesture to expand the predefined scrollable area: expand the predefined scrollable area from the first predefined size to the second predefined size (e.g., with the expanding unit 818), and enable display of an array of graphical objects, each respective graphical object representing a set of content items, in the predefined scrollable area at the second predefined size (e.g., with the display enabling unit 812).

In some embodiments, the processing unit 806 is configured to: detect a gesture on a graphical object in the array of graphical objects (e.g., with the detecting unit 808); and, in response to detecting the gesture on the graphical object, play respective portions of one or more content items in the set of content items corresponding to the graphical object in the array of graphical objects (e.g., with the playing unit 810).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6D, 7A-7D may be implemented by components depicted in FIGS. 1A-1B. For example, detection operation 620 or 718, scrolling operation 722, and playing operation 626 or 724 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
      displaying a predefined scrollable area, wherein
         the predefined scrollable area concurrently displays a pointer object and at least some of a plurality of album art images;
         the pointer object is overlaid on a respective album art image in the plurality of album art images;
         each of the plurality of album art images represents a respective set of content items; and
         the predefined scrollable area is configured to scroll the plurality of album art images in a first direction;
      detecting a first finger drag gesture or a first finger swipe gesture in a horizontal or a vertical direction;
      in response to detecting the first finger drag gesture or the first finger swipe gesture:
         scrolling the plurality of album art images such that the pointer object coincides with and is overlaid on at least a portion of a first album art image in the plurality of album art images; and
         playing respective portions of one or more content items in the set of content items that correspond to the first album art image;
      detecting a second finger drag gesture or a second finger swipe gesture in a vertical direction when the first finger drag gesture or the first finger swipe gesture is in a horizontal direction and in a horizontal direction when the first finger drag gesture or the first finger swipe gesture is in a vertical direction, starting in the predefined scrollable area, to expand the predefined scrollable area from a first predefined size to a second predefined size larger than the first predefined size; and
      in response to detecting the second finger drag gesture or the second finger swipe gesture to expand the predefined scrollable area:
         expanding the predefined scrollable area from the first predefined size to the second predefined size; and
         displaying a multi-row array of album art images, each respective album art image representing a respective set of content items, in the predefined scrollable area at the second predefined size.

2. The portable electronic device of claim 1, wherein a respective portion of a respective content item starts playing from a predefined location in the respective content item.

3. The portable electronic device of claim 1, wherein the respective portions are played in an order that corresponds to an order of the content items within the set of content items.

4. The portable electronic device of claim 1, including instructions for:
   while playing a portion of a first content item in the set of content items that corresponds to the first album art image, detecting a scrolling gesture; and,
   in response to detecting the scrolling gesture:
      scrolling the plurality of album art images in the predefined scrollable area in accordance with the scrolling gesture;
      ceasing to play the portion of the first content item in the set of content items that corresponds to the first album art image;
      playing respective portions of one or more content items in the set of content items that correspond to the first album art image, other than the first content item, while the pointer object coincides with and is overlaid on at least a portion of the first album art image; and
      playing respective portions of one or more content items in the set of content items that correspond to a second album art image, distinct from the first album art image, while the pointer object coincides with and is overlaid on at least a portion of the second album art image.

5. The portable electronic device of claim 1, including instructions for:
   detecting a gesture that corresponds to selection of a second album art image of the plurality of album art images in the predefined scrollable area; and
   in response to detecting the gesture that corresponds to selection of the second album art image, playing respective portions of one or more content items in the set of content items that correspond to the selected second album art image.

6. The portable electronic device of claim 1, wherein:
   detecting a first finger drag gesture or a first finger swipe gesture includes detecting that the first finger drag gesture or the first finger swipe gesture is in a horizontal direction, scrolling the plurality of album art images includes scrolling the plurality of album art images in the horizontal direction, detecting a second finger drag gesture or a second finger swipe gesture includes detecting that the second finger drag gesture or the second finger swipe gesture is in a vertical direction, and expanding the predefined scrollable area from the first predefined size to the second predefined size includes expanding the predefined scrollable area in the vertical direction.

7. A method, comprising:

at a portable electronic device with a display and a touch-sensitive surface:

displaying a predefined scrollable area, wherein:
the predefined scrollable area concurrently displays a pointer object and at least some of a plurality of album art images;
the pointer object is overlaid on a respective album art image in the plurality of album art images;
each of the plurality of album art images represents a respective set of content items; and
the predefined scrollable area is configured to scroll the plurality of album art images in a first direction;

detecting a first finger drag gesture or a first finger swipe gesture in a horizontal or a vertical direction;

in response to detecting the first finger drag gesture or the first finger swipe gesture:
scrolling the plurality of album art images such that the pointer object coincides with and is overlaid on at least a portion of a first album art image in the plurality of album art images; and
playing respective portions of one or more content items in the set of content items that correspond to the first album art image;

detecting a second finger drag gesture or a second finger swipe gesture in a vertical direction when the first finger drag gesture or the first finger swipe gesture is in a horizontal direction and in a horizontal direction when the first finger drag gesture or the first finger swipe gesture is in a vertical direction, starting in the predefined scrollable area, to expand the predefined scrollable area from a first predefined size to a second predefined size larger than the first predefined size; and in response to detecting the second finger drag gesture or the second finger swipe gesture to expand the predefined scrollable area:
expanding the predefined scrollable area from the first predefined size to the second predefined size; and
displaying a multi-row array of album art images, each respective album art image representing a respective set of content items, in the predefined scrollable area at the second predefined size.

8. The method of claim 7, wherein a respective portion of a respective content item starts playing from a predefined location in the respective content item.

9. The method of claim 7, wherein the respective portions are played in an order that corresponds to an order of the content items within the set of content items.

10. The method of claim 7, including:
while playing a portion of a first content item in the set of content items that corresponds to the first album art image, detecting a scrolling gesture; and, in response to detecting the scrolling gesture:
scrolling the plurality of album art images in the predefined scrollable area in accordance with the scrolling gesture;
ceasing to play the portion of the first content item in the set of content items that corresponds to the first album art image;
playing respective portions of one or more content items in the set of content items that correspond to the first album art image, other than the first content item, while the pointer object coincides with and is overlaid on at least a portion of the first album art image; and
playing respective portions of one or more content items in the set of content items that correspond to a second album art image, distinct from the first album art image, while the pointer object coincides with and is overlaid on at least a portion of the second album art image.

11. The method of claim 7, including:
detecting a gesture that corresponds to selection of a second album art image of the plurality of album art images in the predefined scrollable area; and
in response to detecting the gesture that corresponds to selection of the second album art image, playing respective portions of one or more content items in the set of content items that correspond to the selected second album art image.

12. A non-transitory computer readable storage medium storing one or more programs, the one or more programs comprising instructions, which when executed by a portable electronic device with a display and a touch-sensitive surface, cause the device to:

display a predefined scrollable area, wherein
the predefined scrollable area concurrently displays a pointer object and at least some of plurality of album art images;
the pointer object is overlaid on a respective album art image in the plurality of album art images;
each of the plurality of album art images represents a respective set of content items; and
the predefined scrollable area is configured to scroll the plurality of album art images in a first direction;

detect a first finger drag gesture or a first finger swipe gesture in a horizontal or a vertical direction;

in response to detecting the first finger drag gesture or the first finger swipe gesture:
scroll the plurality of album art images such that the pointer object coincides with and is overlaid on at least a portion of a first album art image in the plurality of album art images; and
play respective portions of one or more content items in the set of content items that correspond to the first album art image;

detect a second finger drag gesture or a second finger swipe gesture in a vertical direction when the first finger drag gesture or the first finger swipe gesture is in a horizontal direction and in a horizontal direction when the first finger drag gesture or the first finger swipe gesture is in a vertical direction, starting in the predefined scrollable area, to expand the predefined scrollable area from a first predefined size to a second predefined size larger than the first predefined size; and in response to detecting the second finger drag gesture or the second finger swipe gesture to expand the predefined scrollable area:
expand the predefined scrollable area from the first predefined size to the second predefined size; and display a multi-row array of album art images, each respective album art image representing a respective set of content items, in the predefined scrollable area at the second predefined size.

13. The non-transitory computer readable storage medium of claim 12, wherein a respective portion of a respective content item starts playing from a predefined location in the respective content item.

14. The non-transitory computer readable storage medium of claim 12, wherein the respective portions are played in an order that corresponds to an order of the content items within the set of content items.

15. The non-transitory computer readable storage medium of claim 12, the one or more programs including instructions, which when executed by the portable electronic device with the display and the touch-sensitive surface, cause the device to:
   while playing a portion of a first content item in the set of content items that corresponds to the first album art image, detect a scrolling gesture; and,
   in response to detecting the scrolling gesture:
      scroll the plurality of album art images in the predefined scrollable area in accordance with the scrolling gesture;
      cease to play the portion of the first content item in the set of content items that corresponds to the first album art image;
      play respective portions of one or more content items in the set of content items that correspond to the first album art image, other than the first content item, while the pointer object coincides with and is overlaid on at least a portion of the first album art image; and
      play respective portions of one or more content items in the set of content items that correspond to a second album art image, distinct from the first album art image, while the pointer object coincides with and is overlaid on at least a portion of the second album art image.

16. The non-transitory computer readable storage medium of claim 12, the one or more programs including instructions, which when executed by the portable electronic device with the display and the touch-sensitive surface, cause the device to:
   detect a gesture that corresponds to selection of a second album art image of the plurality of album art images in the predefined scrollable area; and
   in response to detecting the gesture that corresponds to selection of the second album art image, play respective portions of one or more content items in the set of content items that correspond to the selected second album art image.

* * * * *